United States Patent
Goto et al.

(10) Patent No.: US 10,034,306 B2
(45) Date of Patent: Jul. 24, 2018

(54) BASE STATION APPARATUS AND TERMINAL DEVICE

(71) Applicant: Sharp Kabushiki Kaisha, Sakai, Osaka (JP)

(72) Inventors: Jungo Goto, Sakai (JP); Osamu Nakamura, Sakai (JP); Hiromichi Tomeba, Sakai (JP); Shiro Wakahara, Sakai (JP); Yasuhiro Hamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/319,823

(22) PCT Filed: Jun. 18, 2015

(86) PCT No.: PCT/JP2015/067621
§ 371 (c)(1),
(2) Date: Dec. 19, 2016

(87) PCT Pub. No.: WO2016/002533
PCT Pub. Date: Jan. 7, 2016

(65) Prior Publication Data
US 2017/0127444 A1 May 4, 2017

(30) Foreign Application Priority Data
Jul. 3, 2014 (JP) .................................. 2014-137377

(51) Int. Cl.
*H04W 16/14* (2009.01)
*H04W 72/04* (2009.01)
(Continued)

(52) U.S. Cl.
CPC ....... *H04W 74/0808* (2013.01); *H04W 16/14* (2013.01); *H04W 56/0015* (2013.01)

(58) Field of Classification Search
CPC ............. H04W 16/14; H04W 56/0015; H04W 74/0808; H04W 72/04; H04W 72/08; H04J 11/00
(Continued)

(56) References Cited

U.S. PATENT DOCUMENTS

2014/0044105 A1* 2/2014 Bontu ................. H04L 5/001
370/336
2014/0378157 A1* 12/2014 Wei .................. H04W 16/14
455/454
(Continued)

FOREIGN PATENT DOCUMENTS

WO 2014/051606 A1 4/2014

OTHER PUBLICATIONS

Official Communication issued in International Patent Application No. PCT/JP2015/067621, dated Aug. 11, 2015.
(Continued)

*Primary Examiner* — Nathan Taylor
(74) *Attorney, Agent, or Firm* — Keating & Bennett, LLP

(57) ABSTRACT

In an LTE-A system, there is a problem that it is difficult to perform stable communication in a case where there is a time when another system occupies an unlicensed band being used. There is provided a base station apparatus that communicates with a terminal device in a second frequency band different from a first frequency band capable of being used as a dedicated frequency band. The base station apparatus includes: a CS determination unit that performs carrier sense in a subframe of carrier sense configured in the second frequency band; a synchronization signal generation unit that generates a synchronization signal; and a wireless transmission unit that transmits the synchronization signal. In a case where the CS determination unit determines that another system does not perform communication in the second frequency band, the wireless transmission unit transmits the synchronization signal generated by the synchronization signal generation unit.

5 Claims, 8 Drawing Sheets

(51) Int. Cl.
    *H04W 72/08*     (2009.01)
    *H04W 74/08*     (2009.01)
    *H04W 56/00*     (2009.01)

(58) Field of Classification Search
    USPC ........................................................ 455/454
    See application file for complete search history.

(56) References Cited

U.S. PATENT DOCUMENTS

| | | | |
|---|---|---|---|
| 2015/0049741 A1* | 2/2015 | Chen ..................... | H04W 48/12 |
| | | | 370/336 |
| 2015/0063148 A1* | 3/2015 | Sadek ...................... | H04L 1/20 |
| | | | 370/252 |
| 2015/0085793 A1* | 3/2015 | Luo ...................... | H04L 5/0048 |
| | | | 370/329 |
| 2015/0131536 A1* | 5/2015 | Kaur ...................... | H04L 5/001 |
| | | | 370/329 |
| 2015/0163680 A1* | 6/2015 | Valliappan ............ | H04W 16/14 |
| | | | 370/329 |
| 2015/0319784 A1* | 11/2015 | Bhushan ........... | H04W 74/0816 |
| | | | 370/329 |

OTHER PUBLICATIONS

Ericsson et al., "Study on Licensed-Assisted Access using LTE", 3GPP TSG RAN Meeting #63, RP-140259, Mar. 3-6, 2014, 6 pages.

\* cited by examiner

| UPLINK-DOWNLINK CONFIGURATION | CYCLE AT WHICH SWITCHING IS PERFORMED FROM DOWNLINK TO UPLINK | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 msec | D | S | U | U | U | D | S | U | U | U |
| 1 | 5 msec | D | S | U | U | D | D | S | U | U | D |
| 2 | 5 msec | D | S | U | D | D | D | S | U | D | D |
| 3 | 10 msec | D | S | U | U | U | D | D | D | D | D |
| 4 | 10 msec | D | S | U | U | D | D | D | D | D | D |
| 5 | 10 msec | D | S | U | D | D | D | D | D | D | D |
| 6 | 5 msec | D | S | U | U | U | D | S | U | U | D |

| | SFN #0 | SFN #1 | SFN #2 | SFN #3 | SFN #4 | SFN #5 | SFN #6 | SFN #7 | SFN #8 | SFN #9 |
|---|---|---|---|---|---|---|---|---|---|---|
| STRUCTURE 0 | C | D | D | S | U | C | D | D | S | U |
| STRUCTURE 1 | C | D | S | U | U | C | D | S | U | U |
| STRUCTURE 2 | C | D | D | D | D | C | D | D | D | D |
| STRUCTURE 3 | C | D | D | S | U | C | D | D | S | U |
| STRUCTURE 4 | C | D | D | D | D | S | U | U | U | U |
| STRUCTURE 5 | C | D | D | D | D | D | S | U | U | U |
| STRUCTURE 6 | C | D | D | D | D | D | D | S | U | U |
| STRUCTURE 7 | C | D | D | D | D | D | D | D | S | U |
| STRUCTURE 8 | C | D | D | D | D | D | D | D | D | D |
| STRUCTURE 9 | C | D | D | S | U | U | U | D | D | D |

→ SUBFRAME NUMBER

BASE STATION APPARATUS AND TERMINAL DEVICE

TECHNICAL FIELD

The present invention relates to a base station apparatus and a terminal device.

BACKGROUND ART

The standardization of a Long Term Evolution (LTE) system which is a wireless communication system (Rel. 8 and Rel. 9) of 3.9G mobile phones has been completed, and the standardization of LTE-Advanced (LTE-A) (also referred to as IMT-A) system (from Rel. 10 onwards) which is an enhancement of the LTE system as one of 4G wireless communication systems has been currently performed.

The LTE system or the LTE-A system needs to cope with a rapid increase in data traffic, and the introduction of a technology for improving a peak data rate or spectral efficiency and the reservation of frequency resources are important issues. In the LTE system or the LTE-A system so far, the use of a frequency band referred to as a so-called licensed band permitted for use from a country or a locality in which a radio communication operator provides services is assumed, and there are limitations of an available frequency band.

Thus, the provision of the LTE system (referred to as LTE-U) that uses a frequency band referred to as a so-called unlicensed band which does not require the permission for use from country or locality has been recently discussed (see NPL 1). In the LTE-A system, a carrier aggregation (CA) technology which uses one system band of the LTE system as a component carrier (CC) (also referred to as a serving cell) and performs communication using a plurality of CCs has been adopted. A method of applying this CA technology to the unlicensed band and utilizing the unlicensed band has been expected as one method for coping with the rapid increase in data traffic.

It is considered that a frequency band (for example, a frequency band which is allocated for television broadcasting but is not used by the locality) called a white band (white space) that is not used in reality in order to prevent the crosstalk between frequencies or a shared frequency band which is exclusively allocated to a specific operator but is expected to be shared between a plurality of operators in the future is used for cellular communication in the future in addition to the unlicensed band.

CITATION LIST

Non Patent Literature

NPL 1: RP-140259, "Study on Licensed-Assisted Access using LTE," 3GPP TSG RAN Meeting #63, March 2014.

SUMMARY OF INVENTION

Technical Problem

However, as represented by an IEEE 802.11 system, since the unlicensed band is also used for communication using a radio access technology (RAT) different from LTE, the LTE-A system and another system need to coexist. Particularly, since the use of the licensed band is assumed in the LTE-A system of the related art, the LTE-A system of the related art is not designed in consideration of a case where a frequency band to be used may be occupied by another system. Thus, in the LTE-A system, in a case where there is time when another system occupies the unlicensed band being used, there is a problem that stable communication is not able to be performed. Even in a case where the LTE-A system uses a frequency band other than the licensed band such as the white band (white space), there is a possibility that the communication of the LTE-A system will be influenced by another system similarly to a case where the unlicensed band is used, and there is the same problem.

The present invention has been made in view of such problems, and it is an object of the present invention to provide a data transmission method capable of realizing stable communication even though another system occupies an unlicensed band when an LTE-A system uses the unlicensed band in a case where the LTE-A system shares the unlicensed band or a white band with another system.

Solution to Problem (1) The present invention has been made in order to achieve the aforementioned object, according to an aspect of the present invention, there is provided a base station apparatus that communicates with a terminal device in a second frequency band different from a first frequency band capable of being used as a dedicated frequency band. The base station apparatus includes: a CS determination unit that performs carrier sense in a subframe of carrier sense configured in the second frequency band; a synchronization signal generation unit that generates a synchronization signal; and a wireless transmission unit that transmits the synchronization signal. In a case where the CS determination unit determines that another system does not perform communication in the second frequency band, the wireless transmission unit transmits the synchronization signal generated by the synchronization signal generation unit.

(2) According to the aspect of the present invention, a timing when the wireless transmission unit transmits the synchronization signal is a first OFDM symbol of a downlink subframe configured after at least the subframe of the carrier sense.

(3) According to the aspect of the present invention, a timing when the wireless transmission unit transmits the synchronization signal is a last OFDM symbol of at least the subframe of the carrier sense.

(4) According to the aspect of the present invention, the base station apparatus further includes: a transmit-power control unit. In a case where the synchronization signal is transmitted in the last OFDM symbol of the subframe of the carrier sense, the transmit-power control unit further lowers a transmit power than that in a case where the synchronization signal is transmitted in a subframe of a downlink.

(5) According to the aspect of the present invention, the base station apparatus further includes: a wireless reception unit. The wireless reception unit starts a process of receiving a signal transmitted from the terminal device at a timing shorter than a previously configured guard period by at least one OFDM symbol time.

(6) According to the aspect of the present invention, the wireless transmission unit transmits the synchronization signal in a part of the guard period.

(7) According to the aspect of the present invention, the base station apparatus further includes: a data amount management unit. In a case where a data amount of a downlink buffered from the data amount management unit is less than a previously configured threshold, the synchronization signal generation unit generates a synchronization signal of a sequence different from that in a case where the buffered data amount of the downlink exceeds the threshold.

(8) According to another aspect of the present invention, there is provided a terminal device that communicates with a base station apparatus in a second frequency band different from a first frequency band capable of being used as a dedicated frequency band. The terminal device includes: an available subframe determination unit that detects a synchronization signal transmitted from the base station apparatus; a reception signal detection unit that performs a process of receiving a data signal transmitted from the base station apparatus; a wireless transmission unit that transmits a signal to the base station apparatus. Only in a case where the synchronization signal is detected in a downlink subframe after a subframe of carrier sense by the available subframe determination unit, at least one of data reception by the reception signal detection unit and transmission of a signal through the wireless transmission unit is performed.

(9) According to the aspect of the present invention, the available subframe determination unit performs a process of detecting a timing when the synchronization signal is received, as a first OFDM symbol of a downlink subframe configured after the subframe of the carrier sense.

(10) According to the aspect of the present invention, the terminal device further includes: a control signal detection unit that detects control information transmitted from the base station apparatus. In a case where the available subframe determination unit is not able to detect the synchronization signal in a downlink subframe after the subframe of the carrier sense, the control signal detection unit determines that the control information is not transmitted from the base station apparatus.

(11) According to the aspect of the present invention, the available subframe determination unit performs a process of detecting a timing when the synchronization signal is received, as a last OFDM symbol of the subframe of the carrier sense, and the control signal detection unit determines that the control information is not transmitted from the base station apparatus in a case where the available subframe determination unit is not able to detect the synchronization signal.

(12) According to the aspect of the present invention, the wireless transmission unit transmits a signal at a timing shorter than a previously configured guard period by at least one OFDM symbol time.

(13) According to the aspect of the present invention, the terminal device further includes: a wireless reception unit that performs carrier sense for determining whether or not another system performs communication in the second frequency band. The available subframe determination unit detects the synchronization signal transmitted from the base station apparatus, recognizes a sequence used for the synchronization signal, and determines whether or not to perform carrier sense in a subframe switched to an uplink from a downlink before a subframe in which ACK/NACK of downlink data or data transmitted to the base station apparatus is transmitted, based on the recognized sequence.

Advantageous Effects of Invention

According to the present invention, it is possible to efficiently share information indicating whether a base station apparatus and a terminal device is able to use an unlicensed band or is not able to use due to the reason why another system occupies the unlicensed band.

DESCRIPTION OF EMBODIMENTS

1. First Embodiment

Figures 1, 2:
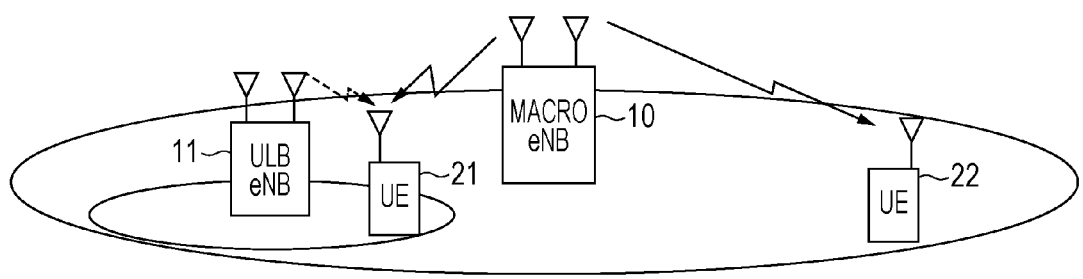
FIG. 1 is a diagram showing an example of a structure of a system according to the present invention.
FIG. 2 is a diagram showing a frame structure of TDD of an LTE system.

Hereinafter, an embodiment will be described with reference to the drawings. FIG. 1 illustrates an example of a structure of a system according to the present invention. The system includes a macro base station apparatus 10, a ULB base station apparatus 11, and terminal devices 21 and 22. The number of terminal devices (terminals, mobile terminals, mobile stations, or user equipment (UE)) is not limited to 2, and the number of antennas of each device may be 1, or may be plural in number. It is assumed that the macro base station apparatus 10 performs communication using a so-called licensed band of which permission for use is gained by a country or a locality where a radio communication operator provides services and the ULB base station apparatus 11 performs communication using a so-called unlicensed band which does not require the permission for use by the country or locality, but the present invention is not limited to this example. For example, the macro base station apparatus 10 may support the communication using the unlicensed band as well as the licensed band, and a pico base station apparatus (referred to as a pico eNB, Evolved Node B, small cell, low power node, or remote radio head) capable of performing the communication in the licensed band may support the communication using the unlicensed band. The unlicensed band may support only a downlink which is communication from the ULB base station apparatus 11 to the terminal device 21, and may support an uplink which is communication from the terminal device 21 to the ULB base station apparatus 11 as well as the downlink. Although it will be described in the present specification that a frequency band other than the licensed band is the unlicensed band, the present invention is not limited thereto.

The terminal device 21 may communicate with at least any one of the macro base station apparatus 10 and the ULB base station apparatus 11. Meanwhile, the terminal device 22 is connected to only the macro base station apparatus 10. In such a case, the terminal device 21 may communicate with any one CC or both CCs of a component carrier (referred to as a CC or a serving cell) of the licensed band and a CC of the unlicensed band. Here, in a case where the CC (hereinafter, referred to as an ULB-CC) of the unlicensed band is occupied by another system (for example, 802.11a, b, g, n, or ac), the terminal device 21 may perform communication in only the CC (hereinafter, referred to as an LB-CC) of the licensed band. In a case where the communication is performed in the ULB-CC, at least one of the ULB base station apparatus 11 and the terminal device 21 need to perform carrier sense (for example, listen before talk) for checking whether or not the ULB-CC is used by another system. For example, the ULB base station apparatus 11 or the terminal device 21 may start communication based on an access scheme called carrier sense multiple access with collision avoidance (CSMA/CA). A specific example of the carrier sense is to determine whether or not the ULB-CC is used by another system depending on whether or not a reception level (for example, a received signal strength indicator (RSSI)) of a carrier frequency exceeds a threshold. Although it will be described that time division duplex (referred to as TDD or frame structure type 2) is applied to the ULB-CC, the ULB-CC may support frequency division duplex (referred to as FDD or frame structure type 1).

FIG. 2 illustrates a frame structure of the TDD of the LTE system. In this drawing, in the TDD of the LTE system, a plurality of uplink-downlink configurations is prepared, and is appropriately configured on a per CC basis. D is a downlink subframe, U is an uplink subframe, and S is a special subframe. The special subframe includes a guard period (GP), a downlink pilot time slot (DwPTS), and an uplink pilot time slot (UpPTS) which are required when from the downlink to the uplink is switched. A cycle at which switching is performed from the downlink to the uplink is 5 msec (configurations #0, #1, #2, and #6) and 10 msec (configurations #3, #4, and #5). A pattern of the D, U, and S used at this cycle is repeated. Since an LTE system or an LTE-A system can occupy and use the licensed band, this system constantly performs communication with any pattern.

Figure 3:
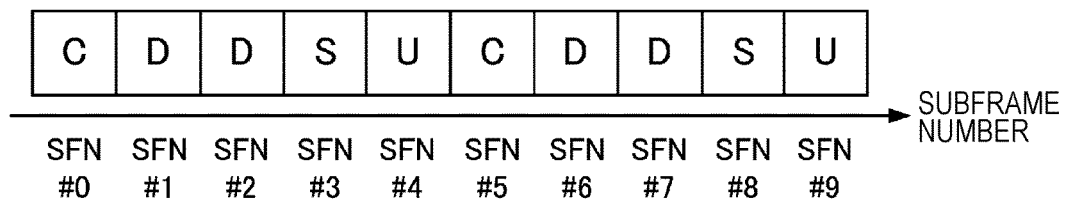
FIG. 3 is a diagram showing an example of a frame structure according to the present invention.

FIG. 3 illustrates an example of a frame structure according to the present invention. In the ULB-CC of the unlicensed band, for the coexistence with another system, since it is necessary to perform the carrier sense (CS) before communication is started, the subframe #0 and the subframe #5 which are C in this drawing are periods during which the carrier sense is performed. In a case where the ULB base station apparatus 11 performs the carrier sense in at least the subframes #0 and #5 and another system does not use the ULB-CC, the transmission of the downlink is started in the subframe #1. In a case where the ULB base station apparatus 11 performs the carrier sense in the subframe #0 and #5 and another system uses the ULB-CC, the transmission is not performed until it is checked that another system does not use the ULB-CC in the subframe of the carrier sense. Specifically, in a case where it is determined that another system uses the ULB-CC as a result of the carrier sense in the subframe #0, the ULB base station apparatus 11 regards the subframes #1 to #4 as unavailable subframes. That is, the communication using the ULB-CC between the ULB base station apparatus 11 and the terminal device is not performed in the subframes #1 to #4. Meanwhile, in a case where it is determined that another system does not use the ULB-CC as a result of the carrier sense in the subframe #0, the ULB base station apparatus 11 regards the subframes #1 to #4 as available subframes. That is, the communication using the ULB-CC between the ULB base station apparatus 11 and the terminal device is performed in the subframes #1 to #4.

Figure 4:
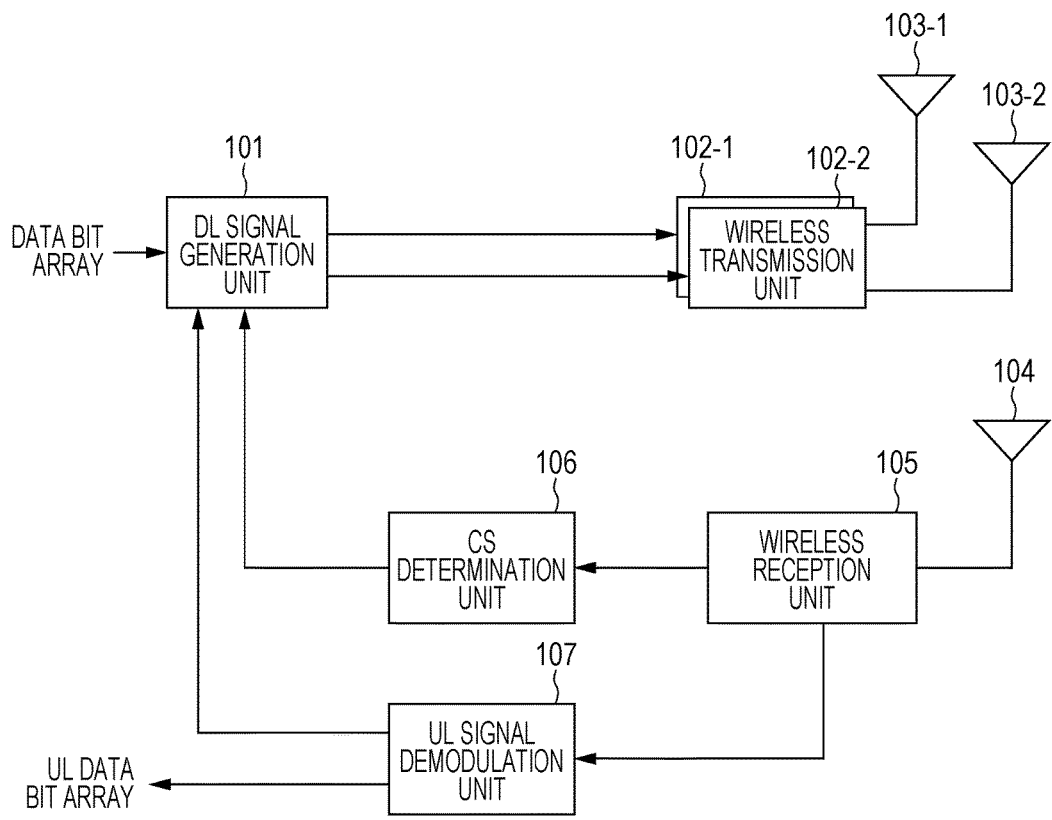
FIG. 4 is a diagram showing an example of a structure of a base station apparatus according to the present invention.

FIG. 4 illustrates an example of a structure of the base station apparatus according to the present invention. Here, minimum blocks required in the present invention are illustrated. This drawing is a structure example of the ULB base station apparatus 11, but the ULB base station apparatus has the same structure as that of a base station apparatus (for example, a macro base station apparatus 10) that performs communication in only the LB-CC of the licensed band in that a CS determination unit 106 is not provided. The ULB base station apparatus 11 receives control information transmitted over physical uplink control channel (PUCCH) or control information transmitted over physical uplink shared channel (PUSCH) from the terminal device by the receive antenna 104. A reception process for checking whether or not another system uses the ULB-CC is performed in the subframe of the carrier sense. In the case of the uplink subframe, a wireless reception unit 105 performs up-conversion of the reception signal so as to convert a frequency of the signal to a baseband frequency, converts analog/digital (A/D) conversion, and inputs a signal acquired by removing cyclic prefix (CP) from the digital signal to a UL signal demodulation unit 107. Thereafter, the UL signal demodulation unit 107 extracts channel state information (CSI), scheduling request (SR), acknowledgement/negative acknowledgement (ACK/NACK), or a random access channel (RACH) signal from the control information having no CP, and inputs the extracted information to a DL signal generation unit 101. The UL signal demodulation unit 107 demodulates a data signal, and detects a data bit array of the uplink.

Meanwhile, in the case of the subframe of the carrier sense, the wireless reception unit 105 inputs the reception signal to the CS determination unit 106. The CS determination unit 106 determines whether or not another system uses the ULB-CC as a result of the carrier sense, determines to set the subframes including the next subframe of the carrier sense to be the available subframes or the unavailable subframes, and determines whether or not to perform the communication using the ULB-CC. Even though another system does not use the ULB-CC as a result of the carrier sense, the subframe of the carrier sense may be set to be the unavailable subframe in a case where there is no transmission data of the downlink. The CS determination unit 106 inputs information indicating whether or not the ULB-CC is able to be used to the DL signal generation unit 101.

Figure 5:
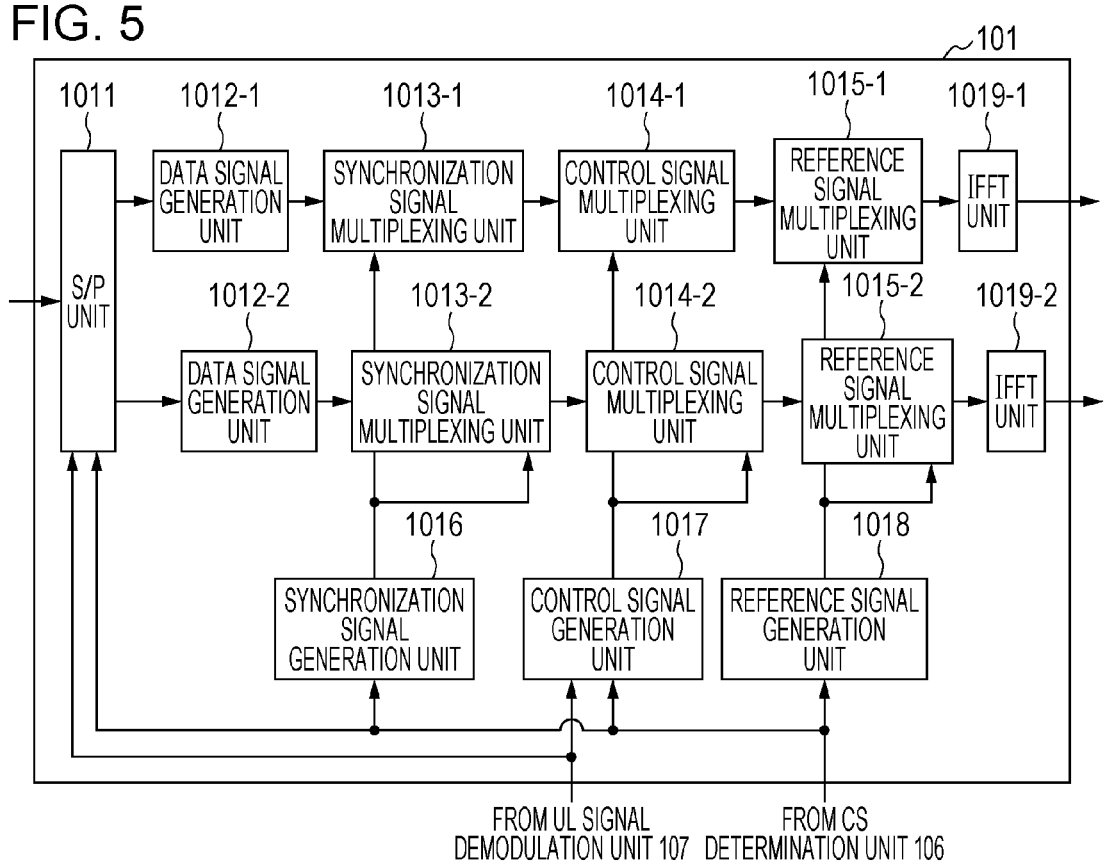
FIG. 5 is a diagram showing an example of a structure of a DL signal generation unit 101 according to the present invention.

FIG. 5 illustrates an example of a structure of the DL signal generation unit 101 according to the present invention. The DL signal generation unit 101 outputs the information indicating whether or not the ULB-CC is able to be used which is input from a CS determination unit 106 to the S/P unit 1011, a synchronization signal generation unit 1016, a control signal generation unit 1017, and a reference signal generation unit 1018. The DL signal generation unit 101 outputs the control information of the uplink input from the UL signal demodulation unit 107 to the S/P unit 1011 and the control signal generation unit 1017. In a case where the ULB-CC is not able to be used (in a case where it is determined that the subframe is the unavailable subframe), the S/P unit 1011, the synchronization signal generation unit 1016, the control signal generation unit 1017, and the reference signal generation unit 1018 do not perform any process. In a case where the ULB-CC is able to be used (in a case where it is determined that the subframe is the available subframe), these units perform the following process. The S/P unit 1011 receives the ACK/NACK of the previous transmission occasion from the UL signal demodulation unit 107, and divides a new data bit array into a predetermined number of transmission streams in a case where the ACK is input. The S/P unit 1011 divides the data bit array transmitted on the previous transmission occasion into a predetermined number of transmission streams in a case where the NACK is input. Although it will be described in the present embodiment that the number of streams is 2, the number of streams may be plural in number, or may be 1. The data signal generation units 1012-1 and 1012-2 generate a data transmit signal sequence from the data bit array. Here, the processes of the data signal generation units 1012-1 and 1012-2 include error correction coding, puncturing and modulation based on a modulation and coding scheme (MCS), signal generation for each antenna port through the multiplication of a precoding matrix, and allocation of a signal sequence to a resource used in the downlink based on resource allocation information. It is assumed that the resource is a resource block (RB) including 12 subcarriers or one subframe, or resource block group (RBG) acquired by grouping a plurality of RBs. Here, the number of subcarriers constituting the resource block is not limited to the above-described example, and the resource may be allocated on a per subcarrier basis using one resource block as one subcarrier. The resource allocation information may indicate the allocation of all the subcarriers included in one ULB-CC, or may be information indicating an ULB-CC to be used in a case where there is a plurality of ULB-CCs. The resource allocation information may be information indicating the allocated subcarriers among all the subcarriers of the plurality of ULB-CCs.

The synchronization signal generation unit 1016 generates primary synchronization signal/secondary synchronization signal (PSS/SSS), and inputs the generated signal to synchronization signal multiplexing units 1013-1 and 1013-2. The synchronization signal multiplexing units 1013-1 and 1013-2 multiplex the data transmit signal sequence with the PSS/SSS. A method of multiplexing the PSS/SSS in the present embodiment will be described below. Subsequently, a signal, such as a physical downlink control channel (PDCCH) or an enhanced PDCCH (EPDCCH) which is control signals generated by the control signal generation unit 1017, which is acquiring by multiplexing the synchronization signal with the data transmit signal sequence, is multiplexed by control signal multiplexing units 1014-1 and 1014-2. A downlink reference signal, for example, a cell-specific reference signal (CRS), a channel state information reference signal (CSI-RS), or a demodulation reference signal (DMRS), which is generated by the reference signal generation unit 1018, is input to the reference signal multiplexing units 1015-1 and 1015-2, and is multiplexed with outputs of control signal multiplexing units 1014-1 and 1014-2. IFFT units 1019-1 and 1019-2 convert a frequency-domain signal sequence into a time-domain signal sequence by performing inverse fast Fourier transform (IFFT) on the signal sequence.

Wireless transmission units 102-1 and 102-2 insert the CP into the time-domain signal sequence, convert the digital signal into an analog signal by performing digital/analog (D/A), and performs up-conversion of a converted signal so as to convert a frequency of the converted signal into a radio frequency to be used for transmission. The wireless transmission units 102-1 and 102-2 amplify the up-converted signal by a power amplifier (PA), and transmit the amplified signal through transmit antennas 103-1 and 103-2. As stated above, in the downlink, an orthogonal frequency division multiplexing signal (OFDM) is transmitted to the terminal device.

Figure 6:
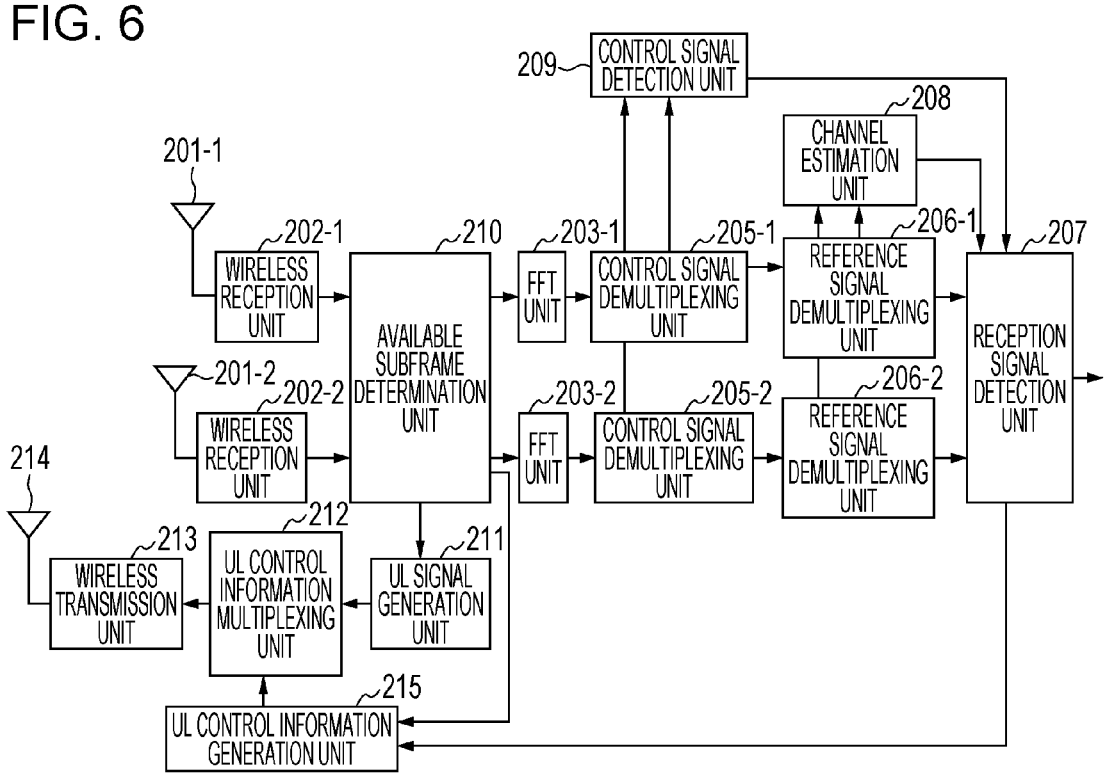
FIG. 6 is a diagram showing an example of a structure of a terminal device according to the present invention.

FIG. 6 illustrates an example of a structure of the terminal device according to the present invention. The signals are received by receive antennas 201-1 and 201-2. Wireless reception units 202-1 and 202-2 perform down-conversion of the reception signal so as to covert a frequency of the reception signal into a baseband frequency, and generate a digital signal by performing A/D conversion on the down-converted signal. The wireless reception units 202-1 and 202-2 input a signal acquired by removing the CP from the digital signal to an available subframe determination unit 210.

The available subframe determination unit 210 detects the PSS/SSS at a reception timing of a signal which includes the PSS/SSS to be described below. If the detection of the PSS/SSS fails, the ULB base station apparatus 11 determines that the ULB-CC is used by another system or there is no data signal to be transmitted, and the terminal device regards the subframes including the next subframe of the carrier sense as the unavailable subframes. The terminal device does not perform a reception process of downlink data or the control signal in the unavailable subframe. For example, in the frame structure example of FIG. 3, in a case where the detection of the PSS/SSS included in the SFNs #0 to #4 fails, the SFNs #0 to #4 of the ULB-CC are not used. Here, a case where the detection of the PSS/SSS fails is a case where a received power is less than a previously configured threshold or a correlation value is less than a threshold. Subsequently, in a case where the detection of the PSS/SSS succeeds, the terminal device determines that the ULB-CC is used, and regards the subframes including the next subframe of the carrier sense as the available subframes. The terminal device performs a reception process of the downlink or a transmission process of the uplink in the available subframe. For example, in the frame structure example of FIG. 3, in a case where the detection of the PSS/SSS included in the SFNs #0 to #4 succeeds, the SFNs #0 to #4 of the ULB-CC are used. At a reception timing of the signal which does not include the PSS/SSS, the available subframe determination unit 210 inputs the reception signal to FFT units 203-1 and 203-2 in a case where the detection of the PSS/SSS succeeds, and discards the reception signal in a case where the detection of the PSS/SSS fails.

The FFT units 203-1 and 203-2 convert the time-domain signal sequence into the frequency-domain signal sequence by performing fast Fourier transform on the input reception signal sequence, and input the frequency-domain signal sequence to control signal demultiplexing units 205-1 and 205-2. The control signal demultiplexing units 205-1 and 205-2 demultiplex the signal transmitted over the PDCCH or the EPDCCH in the downlink subframe of the available subframe, and input the demultiplexed signals to a control signal detection unit 209. Even in a case where a radio resource control (RRC) signal is received, the control signal demultiplexing units 205-1 and 205-2 demultiplex the signal, and inputs the demultiplexed signals to the control signal detection unit 209. The control signal detection unit 209 detects a downlink control information (DCI) format addressed to the terminal device the over the PDCCH or the EPDCCH through blind decoding. The control signal detection unit 209 detects the RRC signal. The control signal detection unit 209 inputs the detected control information to the reception signal detection unit 207.

Reference signal demultiplexing units 206-1 and 206-2 demultiplex the input signal into the reference signal and the data signal, and inputs the demultiplexed signals to the channel estimation unit 208 and the reception signal detection unit 207. The channel estimation unit 208 estimates a frequency response of a channel for demodulation by using the CRS, the CSI-RS, or the DMRS which is the input reference signal, and inputs the estimated frequency response for demodulation to the reception signal detection unit 207. Although not illustrated, the channel estimation unit 208 inputs the channel state information (CSI) estimated using the CRS or the CSI-RS to an UL control information generation unit 215 in order to periodically or aperiodically notify (report) the base station apparatus of the information. The reception signal detection unit 207 detects the data signal of the downlink. The reception signal detection unit 207 performs an equalization process based on the frequency response of the channel, a demodulation process based on a modulation scheme notified through the DCI format, and an error correction decoding process of a log likelihood ratio (LLR) of a bit sequence acquired through demodulation by using information of the error correction coding notified through the DCI format. The reception signal detection unit 207 performs hard decision on the decoded LLR sequence, and outputs the bit array in a case where there is no error through a cyclic redundancy check (CRC). The reception signal detection unit 207 inputs information indicating whether or not there is an error of the reception data to the UL control information generation unit 215. This information is used for transmitting the ACK/NACK.

Meanwhile, the available subframe determination unit 210 stores the detection result of the PSS/SSS and the frame structure which is previously notified and is used in the ULB-CC. The frame structure is notified using a control signal of a higher layer, and is, for example, RRC signalling. Here, the frame structure may be notified using a control signal of a physical layer. A frame structure example used in the ULB-CC is an example described in FIG. 7. In the example of this drawing, in structures #0 to #3, the subframes in which the carrier sense is performed are repeated at five subframe cycles, and in structures #4 to #9, the subframes in which the carrier sense is performed are repeated at 10 subframe cycles. The structure example of the frame used in the ULB-CC is not limited to FIG. 7, and may include the subframes in which the carrier sense is performed and the downlink subframes. For example, a proportion between the downlink and uplink subframes or a cycle of a subframe in which the carrier sense is performed may be different from that in the structure described in FIG. 7.

In a case where information of the detection result of the PSS/SSS indicates detection success, the available subframe determination unit 210 inputs the notified information of the information of the uplink subframe (information of the available subframe of the uplink) to an UL signal generation unit 211 and the UL control information generation unit 215. In a case where the information of the detection result of the PSS/SSS indicates detection success, the available subframe determination unit 210 inputs the notified information of the timing of the downlink subframe (information of the available subframe of the downlink) to the control signal demultiplexing units 205-1 and 205-2. In a case where the information of the detection result of the PSS/SSS indicates detection failure (it is determined that the subframe is the unavailable subframe), the available subframe determination unit 210 does not any process. The UL signal generation unit 211 converts the data signal of the uplink into discrete Fourier transform spread OFDM (DFTS-OFDM: referred to as SC-FDMA). Although the DFTS-OFDM is used in the present embodiment, the present invention is not limited thereto, and a multi-carrier signal such as OFDM or MC-CDMA may be used. The process performed by the UL signal generation unit 211 includes error correction coding, modulation, DFT, frequency resource allocation, and IFFT. Information of the ACK/NACK is input to the UL control information generation unit 215 from the reception signal detection unit 207, and although not illustrated, the information of the CSI is input thereto from the channel estimation unit 208. The UL control information generation unit 215 converts the ACK/NACK or periodic CSI into a format of uplink control information (UCI) transmitted over the PUCCH, and inputs the converted information to an UL control information multiplexing unit 212. The UL control information multiplexing unit 212 multiplexes the uplink data with the control information. Here, in a case where the PUSCH and the PUCCH are not simultaneously transmitted, only one signal thereof constitutes a transmission frame. In a case where a resource allocation request of the uplink is performed, the UL control information generation unit 215 generates the SR or the RACH signal, and transmits the generated signal. Here, the SR is transmitted over the PUCCH, and the RACH signal uses a predetermined resource. The uplink signal is transmitted through the wireless transmission unit 213 and the transmit antenna 214.

Although it has been described that the control signal of the uplink is transmitted in the ULB-CC, the UL control information generation unit 215 does not any process on the signal transmitted to the ULB-CC in a case where the control signal of the uplink is transmitted in only the LB-CC. Although it has been described that the data signal of the uplink is transmitted in the ULB-CC, in a case where the structure in which there is not the subframe of the uplink is used (or configured) in TDD or the ULB-CC is only the CC (serving cell) of the downlink in FDD, the UL signal generation unit 211, the UL control information multiplexing unit 212, the UL control information generation unit 215, the wireless transmission unit 213, and the transmit antenna 214 are used in only at the time of the transmission to the LB-CC.

Figures 7, 8:
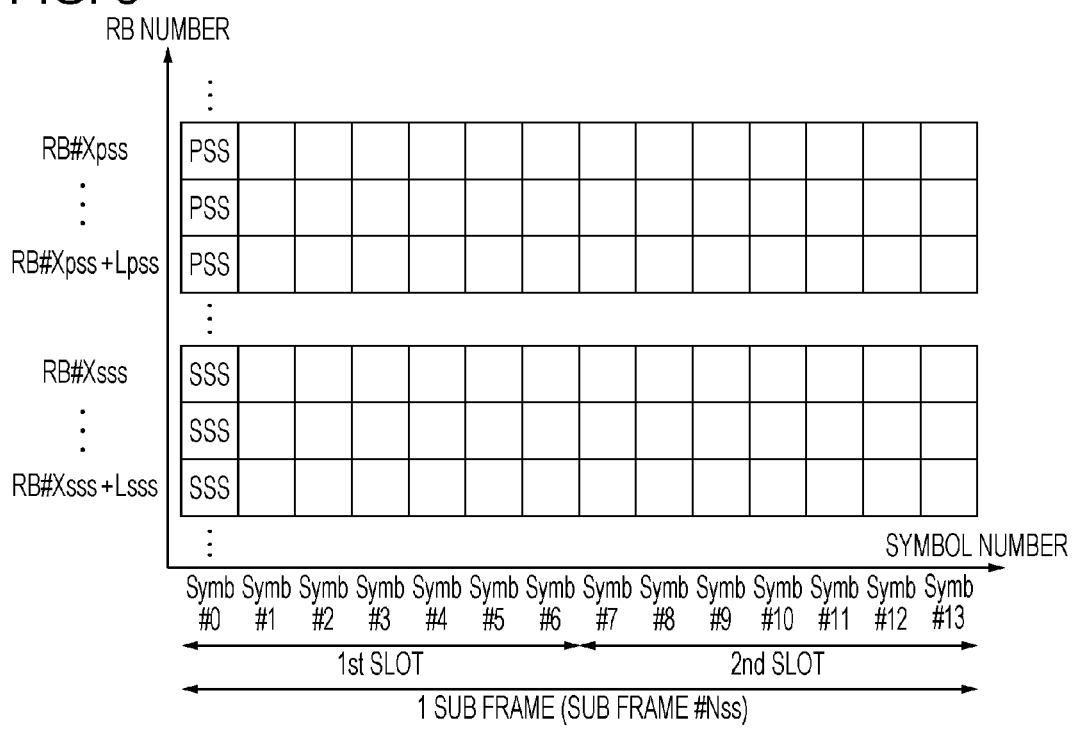
FIG. 7 is a diagram showing an example of the frame structure according to the present invention.
FIG. 8 is a diagram showing an example of a method of multiplexing a synchronization signal according to the present invention.

Although the subframe structure is illustrated in FIGS. 3 and 7, each subframe includes a plurality of OFDM symbols, and 14 OFDM symbols constitute one subframe in the LTE system. Here, in the present invention, the number of OFDM symbols of one subframe is not limited, and an example of 14 OFDM symbols (symbols #0 to #13) will be described. In the present invention, the number of subframes of one frame is not limited, and an example of 10 subframes (subframes #0 to #9) will be described. In the LTE system, the PSS is allocated to the third OFDM symbol (symbol #2) of the subframes #1 and #6 and the SSS is allocated to the seventh OFDM symbol (symbol #6) of the subframes #0 and #5 in TDD, and the PSS is allocated to the last OFDM symbol (symbol #13) of the subframes #0 and #5, and the SSS is allocated to the sixth OFDM symbol (symbol #5) of the subframes #0 and #5 in FDD.

Here, in the ULB-CC, in a case where the frame structure including the subframes of the carrier sense is applied before the data transmission illustrated in FIG. 3 in TDD, it is necessary to recognize the subframes in which the terminal device can perform transmission or reception of data at an earlier timing. The PSS of the LTE system of the related art is allocated to the first subframe of the downlink of FIG. 3, but since the initial subframe is the third OFDM symbol, the PSS is not allocated to the leading OFDM symbol. The SSS of the LTE system of the related art is allocated to the seventh OFDM symbol of the subframe of the carrier sense of FIG. 3. Thus, it is not possible to efficiently recognize the available subframe between the ULB base station apparatus and the terminal device.

FIG. 8 illustrates an example of the method of multiplexing the synchronization signal according to the present invention. In this drawing, seven OFDM symbols constitute one slot and two slots constitute one subframe (14 OFDM symbols). FIG. 8 illustrates an example in which the PSS/SSS is allocated in the leading OFDM symbol of the subframe #$N_{SS}$ in the ULB-CC. #$N_{SS}$ indicates the first downlink subframe after the carrier sense. An example in which the PSS and the SSS are allocated to different resource blocks is illustrated. Thus, the synchronization signal multiplexing units 1013-1 and 1013-2 of the ULB base station apparatus allocate the PSS to RB #$X_{PSS}$ to RB #$X_{PSS}+L_{PSS}$ (the number of resource blocks is $L_{PSS}+1$) and the SSS to RB #$X_{SSS}$ to RB #$X_{SSS}+L_{SSS}$ (the number of resource blocks is $L_{SSS}+1$). Although the PDCCH is allocated to the leading OFDM symbol in the related art, it is assumed that the PDCCH is not allocated to the resource blocks to which the PSS and the SSS are allocated. The control signal such as the PDCCH or the EPDCCH, which uses only the EPDCCH in the ULB-CC may be transmitted in only the LB-CC in which stable communication can be performed without being influenced by the communication of another system. Since the ULB base station apparatus allocates the PSS and the SSS in the LB-CC as stated above and allocates the PSS and the SSS in the ULB-CC as illustrated in FIG. 8, the ULB base station apparatus may change the allocation of the PSS and the SSS depending on whether a frequency band to be used for communication is the LB-CC or the ULB-CC. The number of resource blocks to which the PSS or the SSS is allocated may be the number of all resource blocks (all subcarriers) capable of being used in transmission. Alternatively, as many signals as all the resource blocks may be generated and allocated using a Zadoff-Chu sequence. The PSS and the SSS may not be allocated using two Zadoff-Chu sequences, or a signal to be allocated to the k-th subcarrier may be generated using $\exp(-j\pi uk(k+1)/N)$. Here, the signals may be generated using N as the number of the largest prime number equal to or less than the number of subcarriers to which the signals are allocated and u as a value determined based on the cell ID. The PSS or the SSS may be allocated to a non-continuous subcarrier, or may be allocated at an equal interval.

In a case where the PSS/SSS is transmitted as illustrated in FIG. 8, the terminal device detects the PSS/SSS included in the first OFDM symbol of the leading downlink subframe after the subframe of the carrier sense by the available subframe determination unit 210. Thus, if the PSS/SSS is not detected in the first OFDM symbol, the terminal device determines that the control information or the reference signal is not transmitted from the ULB base station apparatus, and does not need to perform radio resource management (RRM) using the reference signal of the downlink or the blind decoding. Thus, in a case where the PSS/SSS is not included in the first OFDM symbol of the leading downlink subframe after the subframe of the carrier sense, since it is difficult to determine whether or not the subframe is the available subframe until the OFDM symbol including the PSS/SSS, the reception process is required. In contrast, in the present embodiment, in a case where the subframe is not the available subframe, the unnecessary reception process may be omitted, and thus, it is possible to achieve power saving of the terminal device.

Although it has been described in the present embodiment that one subframe is 1 msec, the present invention is not limited to this example, and one subframe may not be 1 msec. Although it has been described in the present embodiment that the cycle of the subframe of the carrier sense is the cycle of five subframes and the cycle of ten subframes, the present invention is not limited to this cycle, and the pattern of the subframe of the carrier sense, the downlink, and the uplink may be repeated within a predetermined cycle. Although it has been described in the present embodiment that both the PSS and the SSS are allocated to the leading OFDM symbol of the first downlink subframe after the subframe of the carrier sense, only any one of the PSS and the SSS may be allocated to the leading OFDM symbol of the first downlink subframe after the subframe of the carrier sense. Although it has been described in the present embodiment that the PSS and the SSS are allocated to only one OFDM symbol within one subframe, the PSS and the SSS may be allocated to two or more OFDM symbols within one subframe, and may be allocated to, for example, the symbol #0 and the symbol #7, or the symbol #0 and the symbol #13. In a case where the PSS and the SSS are allocated to a plurality of OFDM symbols, the resource block to which the PSS and the SSS are allocated may be changed for each OFDM symbol. Although it has been described in the present embodiment that transmission is started in the downlink subframe after the subframe of the carrier sense, the ULB base station apparatus may transmit request to send (RTS) or clear to send (CTS)-to-self before the transmission of the downlink. In this case, the network allocation vector (NAV) may be configured for the RTS. The ULB base station apparatus may perform the transmission of the RTS or CTS-to-self in some of the subframes of the carrier sense.

Although it has been described in the present embodiment that the frame structure example is illustrated as an example of TDD in FIG. 7, the downlink subframe immediately after the carrier-sense subframe is not used unlike the frame structure example of FIG. 7, and the uplink subframe may be used. For example, the structure of the subframe may be in the order of C, U, U, U, and D, in the order of C, U, U, D, and D, or in the order of C, U, D, D, and D. In this case, the terminal device needs to perform carrier sense in the carrier-sense subframe, and the terminal device may perform data transmission in the uplink subframe in a case where it is determined that the subframe is the available subframe as a result of the carrier sense, and may transmit the same PSS/SSS as that of the present embodiment, the reference signal, or an already-known signal such as a training symbol in the first downlink subframe of the available subframe. The present embodiment may be applied to FDD. In a case where the ULB-CC is the CC of the downlink, Structure 2 or Structure 8 which is the frame structure including only D and C in FIG. 7 may be used, and the same PSS/SSS as that of the present embodiment may be transmitted in the first downlink subframe of the available subframe. Although one ULB-CC has been described in the present embodiment, a plurality of ULB-CCs may be present. In this case, the ULB base station apparatus may perform the carrier sense in each ULB-CC, may determine whether the subframe is the available subframe or the unavailable subframe based on the result of the carrier sense for each ULB-CC, and may transmit the same PSS/SSS as that of the present embodiment in the first downlink subframe of the available subframe. The timing of the subframe of the ULB-CC of the present embodiment may be adjusted by synchronizing the timings of the ULB base station apparatus and the terminal device, or the timing between the ULB base station apparatus and the terminal device may be adjusted to the timing of the subframe of the LB-CC of the macro base station apparatus. Although it has been described in the present embodiment that the ULB base station apparatus notifies that the subframe is the available subframe by transmitting the PSS/SSS in the leading OFDM symbol of the first downlink subframe of the available subframe in the ULB-CC, the present invention it not limited to this example. For example, the reference signal such as the CRS, the CSI-RS, or the DMRS may be used instead of the PSS/SSS, a discovery reference signal (DRS) or a positioning reference signal (PRS) may be used, or an already-known signal such as a training symbol may be transmitted.

As stated above, in the present embodiment, the ULB base station apparatus determines whether or not another system uses the ULB-CC in the subframe of the carrier sense, and transmits the PSS/SSS in the leading OFDM symbol of the first downlink subframe after the subframe of the carrier sense in a case where the ULB-CC is able to be used. The terminal device may determine whether or not the data of the ULB-CC is able to be transmitted or received in the leading OFDM symbol of the first subframe of the downlink, and may share information of the result of the efficient carrier sense. As a result, in a case where the subframe is not the available subframe, since the terminal device does not need to perform the reception process such as blind decoding, it is possible to reduce a calculation amount, and it is possible to achieve power saving.

Modification Example 1 of First Embodiment

In the present modification example, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present modification example, and the description of the same processes will be omitted.

In the present modification example, the CS determination unit 106 and the synchronization signal multiplexing units 1013-1 and 1013-2 of the ULB base station apparatus are different from those of the first embodiment. The CS determination unit 106 determines whether or not another system uses the ULB-CC in the subframe of the carrier sense. Here, although it has been described in the first embodiment that the carrier sense is performed during all the periods of the subframes of the carrier sense, the carrier sense is performed in the OFDM symbols except for the last OFDM symbol (symbol #13) within the subframe of the carrier sense in the present modification example. For example, the OFDM symbols in which the carrier sense is performed are OFDM symbols (symbols #0 to #6) of the first slot. The synchronization signal multiplexing units 1013-1 and 1013-2 determine whether or not another system uses the ULB-CC, and input the result thereof to the synchronization signal generation unit 1016. The synchronization signal generation unit 1016 generates PSS/SSS similarly to the first embodiment, and inputs the generated signal to the synchronization signal multiplexing units 1013-1 and 1013-2.

Figure 9:
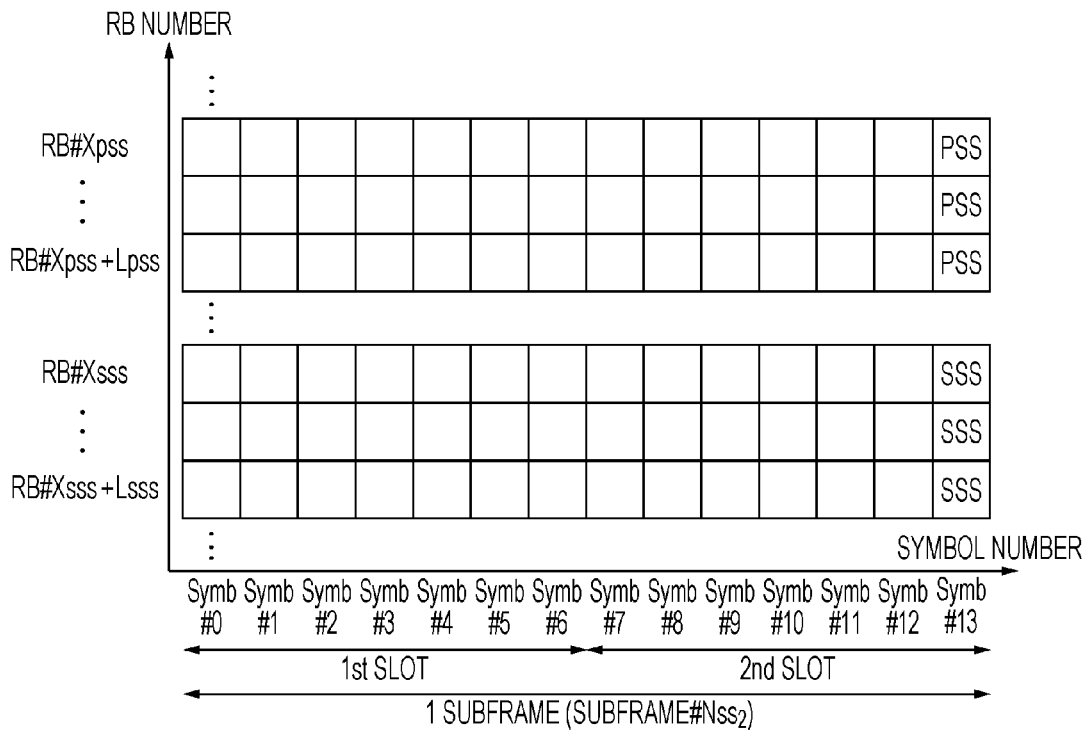
FIG. 9 is a diagram showing an example of the method of multiplexing a synchronization signal according to the present invention.

FIG. 9 illustrates a method of multiplexing the PSS/SSS according to the present modification example. This drawing illustrates an example in which the PSS/SSS is allocated to the last OFDM symbol of the subframe $\#N_{SS2}$. $\#N_{SS2}$ indicates the subframe of the carrier sense. An example in which the PSS and the SSS are allocated to different resource blocks is illustrated. Thus, the synchronization signal multiplexing units 1013-1 and 1013-2 of the ULB base station apparatus allocate the PSS to RB $\#X_{PSS}$ to RB $\#X_{PSS}+L_{PSS}$ (the number of resource blocks is $L_{PSS}+1$) and the SSS to RB $\#X_{SSS}$ to RB $\#X_{SSS}+L_{SSS}$ (the number of resource blocks is $L_{SSS}+1$). Since the ULB base station apparatus allocates the PSS and the SSS in the LB-CC as stated above and allocates the PSS and the SSS in the ULB-CC as illustrated in FIG. 9, the allocation of the PSS and the SSS is changed depending on whether a frequency band to be used for communication is the LB-CC or the ULB-CC.

In a case where the PSS/SSS is transmitted as illustrated in FIG. 9, the terminal device detects the PSS/SSS included in the last OFDM symbol of the subframe of the carrier sense by the available subframe determination unit 210. Thus, if the PSS/SSS is detected in the last OFDM symbol of the subframe of the carrier sense, the terminal device determines that the subsequent downlink and uplink subframes are not the available subframes, and does not need to perform the RRM measurement using the reference signal of the downlink or the blind decoding, the data reception of the downlink, or the data transmission of the uplink.

Although it has been described in the present modification example that the PSS/SSS is transmitted in the last OFDM symbol of the subframe of the carrier sense, a time when the ULB base station apparatus and the terminal device transmit the signal in the ULB-CC becomes 4 subframes+1 OFDM symbol in a case where the subframe structure example of FIG. 3 is applied. Thus, in order to reduce the influence on the communication of another system in the ULB-CC, a transmit power used for the transmission of the PSS/SSS may be lowered. In this case, a transmit-power control units is included in the wireless transmission units 102-1 and 102-2 of the ULB base station apparatus, and the transmit-power control unit lowers the transmit power in the OFDM symbol in which the PSS/SSS is transmitted and transmits the transmit power in the OFDM symbol or the subframe in which the data of the downlink or the control signal is transmitted without lowering the transmit power. The transmit-power control unit transmits the transmit power in the OFDM symbol in which the PSS/SSS of the LB-CC is transmitted without lowering the transmit power.

Although it has been described in the present modification example that the PSS/SSS is transmitted in the subframe of the carrier sense, the ULB base station apparatus may transmit the PSS/SSS in some of the OFDM symbols of the downlink subframe in addition to the transmission of the PSS/SSS in the carrier-sense subframe. In this case, the resource blocks in which the PSS/SSS of the subframe of the carrier sense and the downlink subframe may be different. For example, the ULB base station apparatus may allocate any one of the PSS and the SSS in all the resource blocks in the subframe of the carrier sense, and may allocate the PSS or the SSS to some of the resource blocks in the downlink subframe.

Although it has been described in the present modification example that the cycle of the subframe of the carrier sense is the cycle of five subframes and the cycle of ten subframes, the present invention is not limited to this cycle, and the pattern of the subframe of the carrier sense, the downlink, and the uplink may be repeated within a predetermined cycle. Although it has been described in the present modification example that both the PSS and the SSS are allocated to the last OFDM symbol of the subframe of the carrier sense, only any one of the PSS and the SSS may be allocated to the last OFDM symbol of the subframe of the carrier sense. In this case, the synchronization signal that is not allocated to the last OFDM symbol may be allocated to the OFDM symbol (symbol #12) which is the second to the last OFDM symbol of the subframe of the carrier sense. Although it has been described in the present modification example that the PSS/SSS is transmitted in the last OFDM symbol of the subframe of the carrier sense, the ULB base station apparatus may transmit the RTS or CTS-to-self before the transmission of the PSS/SSS. In this case, the NAV may be configured for the RTS. The ULB base station apparatus may perform the transmission of the RTS or CTS-to-self in some of the subframe of the carrier sense.

Although it has been described in the present modification example that the frame structure example is illustrated as an example of TDD in FIG. 7, the downlink subframe immediately after the carrier-sense subframe is not used unlike the frame structure example of FIG. 7, and the uplink subframe may be used. For example, the structure of the subframe may be in the order of C, U, U, U, and D, in the order of C, U, U, D, and D, or in the order of C, U, D, D, and D. The present modification example may be applied to FDD. In a case where the ULB-CC is the CC of the downlink, Structure 2 or Structure 8 which is the frame structure including only D and C in FIG. 7 may be used, and the same PSS/SSS as that of the present modification example may be transmitted in the first downlink subframe of the available subframe. Although one ULB-CC has been described in the present modification example, a plurality of ULB-CCs may be present. In this case, the ULB base station apparatus may perform the carrier sense in each ULB-CC, may determine whether the subframe is the available subframe or the unavailable subframe based on the result of the carrier sense for each ULB-CC, and may transmit the same PSS/SSS as that of the present modification example in the first downlink subframe of the available subframe. The timing of the subframe of the ULB-CC of the present modification example may be adjusted by synchronizing the timings of the ULB base station apparatus and the terminal device, or the timing between the ULB base station apparatus and the terminal device may be adjusted to the timing of the subframe of the LB-CC of the macro base station apparatus. Although it has been described in the present modification example that the PSS/SSS is transmitted in the last OFDM symbol of the subframe of the carrier sense, the present invention is not limited to this example, and an example in which the PSS/SSS is transmitted at a timing of any one of the subframes of the carrier sense is included in the present invention. Although it has been described in the present modification example that the ULB base station apparatus notifies that the subframe is the available subframe by transmitting the PSS/SSS in the last OFDM symbol of the subframe of the carrier sense in the ULB-CC, the present invention is not limited to this example. For example, the reference signal such as the CRS, the CSI-RS, or the DMRS may be used instead of the PSS/SSS, the DRS or the PRS may be used, or the already-known signal such as the training symbol may be transmitted.

As mentioned above, in the present modification example, the ULB base station apparatus determines whether or not another system uses the ULB-CC in the subframe of the carrier sense, and transmits the PSS/SSS in the last OFDM symbol of the subframe of the carrier sense in a case where the ULB-CC is able to be used. The terminal device may determine whether the data of the ULB-CC in the last OFDM symbol of the subframe of the carrier sense is able to be transmitted or received, and may share information of the result of the efficient carrier sense. As a result, the terminal device may determine whether or not the ULB-CC is able to be used before the subframe of the downlink and does not need to perform the reception process such as blinding decoding in a case where the subframe is the available subframe, it is possible to reduce a calculation amount, and it is possible to achieve power saving.

Modification Example 2 of First Embodiment

In the present modification example, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present modification example, and the description of the same processes will be omitted.

In the present modification example, the PSS/SSS is transmitted by the same method as that of Modification Example 1 of the first embodiment, and is allocated to the last OFDM symbol of the subframe of the carrier sense. Here, the UL signal generation unit 211 of the terminal device is different from that of Modification Example 1 of the embodiment. The UL signal generation unit 211 generates a transmit signal of the uplink based on the information of the timing of the uplink subframe notified from the available subframe determination unit 210. At the transmission timing of the uplink, the uplink pilot time slot (UpPTS) included in the special subframe is also present in addition to the uplink subframe. Particularly, the UpPTS is used for transmitting the SRS or the RACH.

The special subframe includes the GP, the downlink pilot time slot (DwPTS), and the uplink pilot time slot (UpPTS). A proportion of GP times included in the special subframe may be changed depending on the special subframe configuration. In the case of a normal CP in the downlink and the uplink, $T_{DL}$=6592 $T_S$, 19760 $T_S$, 21952 $T_S$, 24144 $T_S$, 26336 $T_S$, or 13168 $T_S$ is designated for the DwPTS, and $T_{UL}$=2192 $T_S$ or 4384 $T_S$ is designated for the UpPTS. Here, $T_S$ is a time which satisfies 1 msec=30720 $T_S$. Since $T_{DL}$ of the DwPTS and $T_{UL}$ of the UpPTS are uniquely determined depending on the special subframe configuration, the GP time is determined by $T_{GP}$=30720 $T_S$-$T_{DL}$-$T_{UL}$.

Thus, in a case where the terminal device transmits the SRS in the UpPTS, the transmission is started after $T_{DL}$+$T_{GP}$ of the special subframe. Here, in the present modification example, in a case where the ULB base station apparatus determines that another system does not use the ULB-CC as the result of the carrier sense, as much time as 1 OFDM symbol+4 subframes in which the PSS/SSS is transmitted is occupied. If the ULB-CC is occupied by the communication between the ULB base station apparatus and the terminal device, since another system is not able to use the ULB-CC, an occupancy time is preferably further reduced. Thus, in the present modification example, the GP time is calculated as $T_{GP2}=30720\ T_S-T_{DL}-T_{UL}-T_{symb}$, and the occupied time is reduced to as much time as four subframes (4 msec) of the related art without reducing the amount of resources capable of being used in the communication between the ULB base station apparatus and the terminal device. Here, $T_{symb}$ is a time of one OFDM symbol. In a case where the SRS is transmitted in the UpPTS, the UL signal generation unit 211 generates the signal transmitted after $T_{DL}+T_{GP2}$. The wireless reception unit 105 and the UL signal demodulation unit 107 of the ULB base station apparatus perform the reception process on the assumption that the terminal device transmits the uplink signal after $T_{DL}+T_{GP2}$ of the special subframe.

Although it has been described in the present modification example that when the terminal device calculates the transmission timing of the UpPTS, the GP time is $T_{GP2}$ in the ULB-CC, the terminal device may set the transmission timing to be $T_{GP}$ as in the related art when the transmission timing of the UpPTS is calculated in the LB-CC. Thus, the terminal device may switch the transmission timing of the UpPTS of the special subframe between the ULB-CC and the LB-CC. Although it has been described in the present modification example that the time of one OFDM symbol is subtracted when the terminal device calculates $T_{GP2}$, the time which is longer than one OFDM symbol may be subtracted. For example, the terminal device calculates the transmission timing of the UpPTS by subtracting as much time as two OFDM symbols at the time of the calculation of $T_{GP2}$. In such a case, the ULB base station apparatus may use any timings of the timings after the DwPTS as the OFDM symbols in which the PSS/SSS is transmitted as many as the GPs are reduced.

As stated above, in the present modification example, when the terminal device calculates a transmission start timing of the UpPTS of the special subframe, a value acquired by subtracting one OFDM symbol from the GP times of the related art is applied. Thus, it is possible to reduce the occupied time, that is, the total time of the downlink subframe, the uplink subframe, and the special subframe, to as much time as four subframes (4 msec) of the related art by using the PSS/SSS transmitted in the last OFDM symbol of the subframe of the carrier sense without reducing the amount of resources capable of being used for the communication between the ULB base station apparatus and the terminal device. It is possible to reduce the time when another system is not able to communicate in the ULB-CC through the communication between the ULB base station apparatus and the terminal device, and it is possible to efficiently use the ULB-CC.

Second Embodiment

In the second embodiment of the present invention, a method of transmitting the ACK/NACK of the downlink transmission in a case where the ULB base station apparatus determines whether the subframe is the available subframe or the unavailable subframe in the subframe of the carrier sense as in the previous embodiment and the ULB base station apparatus transmits the PSS/SSS in a case where the subframe is the available subframe will be described.

In the present embodiment, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present embodiment, and the description of the same processes will be omitted.

When the ULB base station apparatus performs the data transmission of the downlink, resource allocation information (DL grant) of the downlink is generated by the control signal generation unit 1017, and is transmitted to the terminal device. The terminal device detects the resource allocation information (DL grant) by the control signal detection unit 209 through blind decoding, and performs the reception process of the data based on the resource allocation information. As a result of the reception process of the data, ACK/NACK which is information indicating whether or not the resource allocation information is normally detected is generated by the UL control information generation unit 215.

Figure 10:
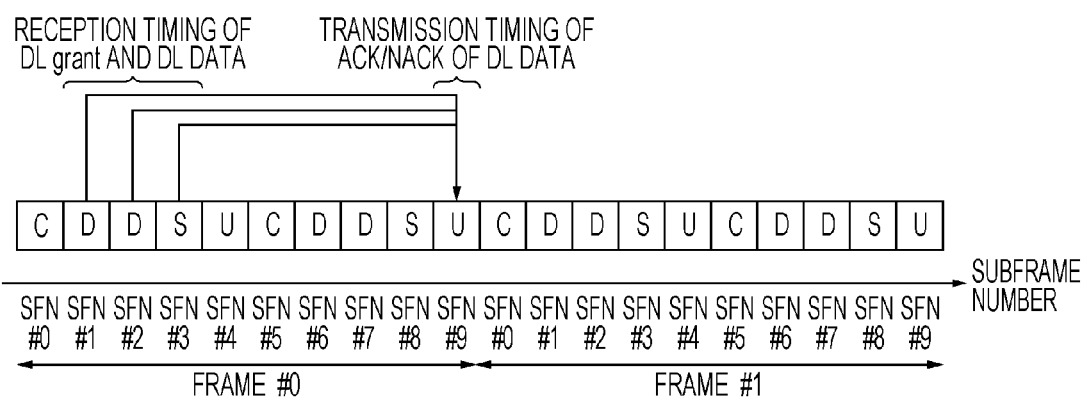
FIG. 10 is a diagram showing an example of transmission of ACK/NACK of a downlink according to the present invention.

FIG. 10 shows an example of the transmission of the ACK/NACK to the downlink according to the present invention. This drawing is an example of the correspondence of the timing when the wireless transmission unit 213 of the terminal device transmits the control information of the uplink including the ACK/NACK with the reception timing of the resource allocation or the data of the downlink. For example, in a case where the timing when the terminal device receives the resource allocation or the data of the downlink is any one of the subframe #1, #2, and #3 of the frame #0, the terminal device transmits the ACK/NACK in the first uplink subframe after four subframes from the subframe in which the resource allocation or the data of the downlink is received. In the example of FIG. 10, the subframe #9 of the frame #0 is available. Here, the ULB base station apparatus determines whether the subframe is the available subframe which is not occupied by another system or the unavailable subframe which is occupied by another system for each subframe of the carrier sense. Initially, in a case where the subframes #5 to #9 of the frame #0 are the available subframes, since the subframe #9 of the frame #0 is able to be used, the terminal device transmits the ACK/NACK of the data received in at least one of the subframes #1, #2, and #3 of the frame #0 in the subframe #9 of the frame #0.

Figure 11:
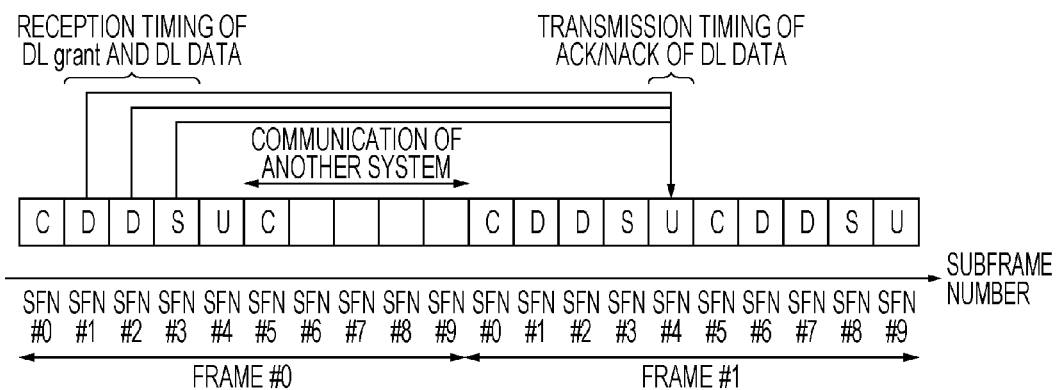
FIG. 11 is a diagram showing an example of the transmission of ACK/NACK of the downlink according to the present invention.

Hereinafter, a case where the subframes #5 to #9 of the frame #0 are the unavailable subframes will be described with reference to FIG. 11. This drawing shows an example in which another system uses the ULB-CC in the carrier sense of the subframe #5 of the frame #0, and the ULB base station apparatus does not transmit the PSS/SSS. Since the PSS/SSS is not able to be detected, the terminal device determines that the subframes #5 to #9 of the frame #0 are the unavailable subframes, and does not transmit the ACK/NACK in the subframe #9 of the frame #0. Here, if the terminal device transmits the ACK/NACK in the subframe #9 of the frame #0, the communication of the terminal device may collide with the communication of another system, and thus, the ULB base station apparatus lowers a probability that the ULB-CC will be able to receive the ACK/NACK. Thus, it is difficult to achieve stable communication in the ULB-CC.

In a case where the ULB base station apparatus determines that the subframes #0 to #4 of the frame #1 are the available subframes as a result of the carrier sense in the subframe #0 of the frame #1, the ULB base station apparatus transmits the PSS/SSS. The terminal device determines that the subframe #4 of the frame #1 is the first uplink subframe after four subframes from the subframe in which the downlink data is received by detecting the PSS/SSS, and transmits the ACK/NACK.

Although it has been described in the present embodiment that the information indicating whether the subframe is the available subframe or the unavailable subframe between the ULB base station apparatus and the terminal device is notified in the detection of the same PSS/SSS as that of the previous embodiment, the present invention is not limited to this method. Thus, an example in which the terminal device determines whether or not the subframe is the available subframe or the unavailable subframe by another method and the ACK/NACK is transmitted in the first available uplink subframe after four subframes from the subframe in which the downlink data is received except for the uplink subframe of the unavailable subframe is included in the present invention. The present embodiment may be applied to FDD. In a case where the CCs of the downlink and the uplink are present in the ULB-CC, the ACK/NACK may be transmitted in the first available subframe of the ULB-CC of the uplink after four subframes from the subframe in which the downlink data is received except for the uplink subframe of the unavailable subframe. Although one ULB-CC has been described in the present embodiment, a plurality of ULB-CCs may be present. In this case, the transmission timing of the ACK/NACK of the present embodiment in each ULB-CC may be applied. The timing of the subframe of the ULB-CC of the present embodiment may be adjusted by synchronizing the timings of the ULB base station apparatus and the terminal device, or the timing between the ULB base station apparatus and the terminal device may be adjusted to the timing of the subframe of the LB-CC of the macro base station apparatus.

As stated above, in the present embodiment, the ULB base station apparatus and the terminal device share the information indicating whether the subframe is the available subframe or the unavailable subframe, and the terminal device transmits the ACK/NACK in the first uplink subframe after four subframes from the subframe in which the downlink data is received except for the uplink subframe of the unavailable subframe. As a result, it is possible to avoid the collision even though another system occupies the ULB-CC from when the downlink data is received to when the ACK/NACK is transmitted, and spectral efficiency is improved by suppressing a deteriorate in communication quality of the ULB-CC.

Modification Example 1 of Second Embodiment

In the present modification example, a method of transmitting the ACK/NACK of the downlink transmission in a case where the ULB base station apparatus determines whether the subframe is the available subframe or the unavailable subframe in the subframe of the carrier sense as in the second embodiment and the ULB base station apparatus transmits the PSS/SSS in a case where the subframe is the available subframe will be described.

In the present modification example, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present modification example, and the description of the same processes will be omitted.

When the ULB base station apparatus performs scheduling of the uplink, resource allocation information (UL grant) of the uplink is generated by the control signal generation unit 1017, and is transmitted to the terminal device. The terminal device detects the resource allocation information (UL grant) through blind decoding by the control signal detection unit 209, and performs the transmission process of the data based on the resource allocation information. As a result of the reception process of the data, the ULB base station apparatus generates ACK/NACK which is information indicating whether or not the resource allocation information is normally detected by the control signal generation unit 1017. Here, the ACK/NACK of the data of the uplink is notified over any one or both of PDCCH/EPDCCH and a physical hybrid-ARQ indicator channel (PHICH).

Figure 12:
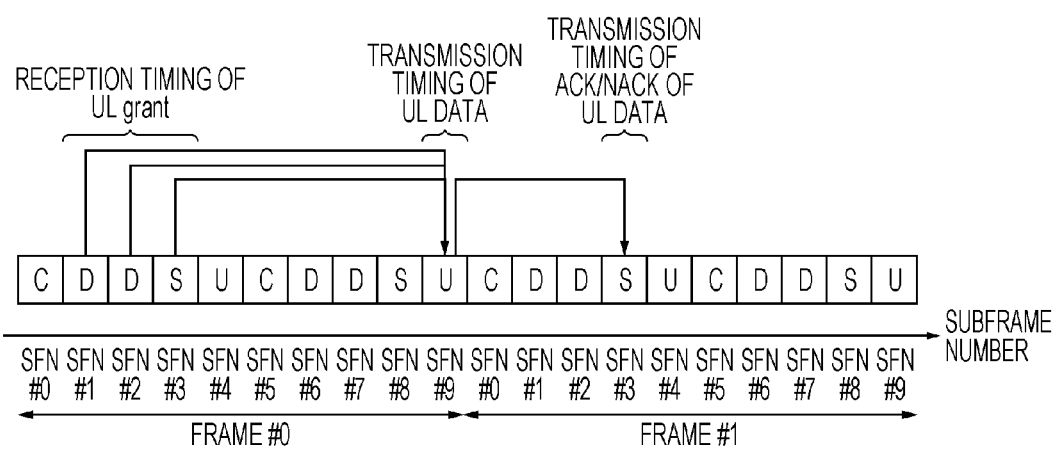
FIG. 12 is a diagram showing an example of transmission of ACK/NACK of an uplink according to the present invention.

FIG. 12 shows an example of the transmission of the ACK/NACK to the uplink according to the present invention. This drawing shows an example of the correspondence of the timing when the wireless transmission unit 213 of the terminal device transmits the data of the uplink regarding the resource allocation information of the uplink with the timing when the wireless transmission units 102-1 and 102-2 of the ULB base station apparatus transmit the control information of the downlink including ACK/NACK with respect to the reception timing of the data of the uplink. For example, in a case where the timing when the terminal device receives the resource allocation of the uplink is any one of the subframes #1, #2, and #3 of the frame #0, the terminal device transmits the data in the first uplink subframe after four subframes from the resource allocation of the uplink. In the example of FIG. 12, the subframe #9 of the frame #0 is available. Here, the ULB base station apparatus determines whether the subframe is the available subframe which is not occupied by another system or the unavailable subframe which is occupied by another system for each subframe of the carrier sense. In a case where the subframes #5 to #9 of the frame #0 are the available subframes, since the subframe #9 of the frame #0 is able to be used, the terminal device transmits the resource allocation or the data of the uplink received in at least one of the subframes #1, #2, and #3 of the frame #0 in the subframe #9 of the frame #0. Here, in a case where the subframes #5 to #9 of the frame #0 are the unavailable subframes, the terminal device transmits the data in the first uplink subframe after four subframes from the subframe in which the resource allocation of the uplink is received except for the uplink subframe of the unavailable subframe.

In a case where the terminal device transmits the data of the uplink in the subframe #9 of the frame #0, the ULB base station apparatus transmits the ACK/NACK of the data of the uplink in the first downlink subframe after four subframes from the subframe of the data transmission of the uplink. FIG. 12 shows a case where the subframes #0 to #4 of the frame #1 are the available subframes, and in this case, the ULB base station apparatus transmits the ACK/NACK of the data of the uplink in the subframe #3 of the frame #1.

Figure 13:
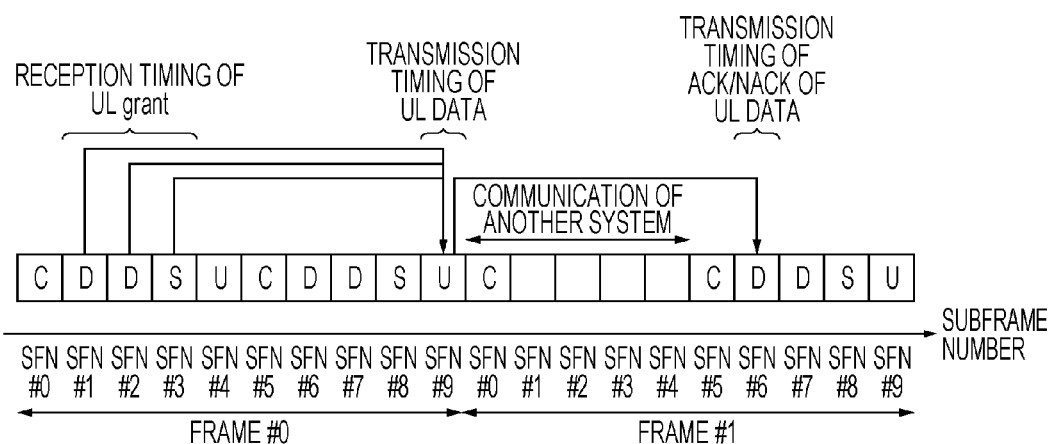
FIG. 13 is a diagram showing an example of the transmission of ACK/NACK of the uplink according to the present invention.

Hereinafter, a case where the subframes #0 to #4 of the frame #1 are the unavailable subframes will be described with reference to FIG. 13. This drawing shows an example in which another system uses the ULB-CC in the carrier sense of the subframe #0 of the frame #1, and the ULB base station apparatus does not transmit the PSS/SSS. Since the PSS/SSS is not able to be detected, the terminal device determines that the subframes #0 to #4 of the frame #1 are the unavailable subframes, and determines that the ACK/NACK of the data of the uplink is transmitted in the next subframe #6 of the frame #1 at the earliest. Here, if the ULB base station apparatus transmits the ACK/NACK in the subframe #3 of the frame #1, the communication of the ULB base station apparatus may collide with the communication of another system, and the terminal device lowers a probability that the ULB-CC will be able to receive the ACK/NACK. Thus, it is difficult to achieve stable communication in the ULB-CC.

In a case where the ULB base station apparatus determines that the subframes #5 to #9 of the frame #1 are the available subframes as the result of the carrier sense in the subframe #5 of the frame #1, the ULB base station apparatus transmits the PSS/SSS. The ULB base station apparatus transmits the ACK/NACK of the data of the uplink received in the subframe #9 of the frame #0 in the subframe #6 of the frame #1. This is because the subframe #6 of the frame #1 corresponds to the first downlink subframe after four subframes from the subframe in which the uplink data is received. The terminal device determines that the subframe #6 of the frame #1 is the first downlink subframe after four subframes from the subframe in which the uplink data is transmitted by detecting the PSS/SSS, and performs the reception process of the ACK/NACK.

Although it has been described in the present modification example that the information indicating whether the subframe is the available subframe or the unavailable subframe is notified between the ULB base station apparatus and the terminal device in the detection of the same PSS/SSS as that of the previous embodiment, the present invention is not limited to this method. Thus, an example in which the terminal device determines whether or not the subframe is the available subframe or the unavailable subframe by another method and the ACK/NACK is transmitted in the first available downlink subframe after four subframes from the subframe in which the uplink data is received except for the downlink subframe of the unavailable subframe is included in the present invention. The present modification example may be applied to FDD. In a case where the CCs of the downlink and the uplink are present in the ULB-CC, the ACK/NACK may be transmitted in the first available subframe of the ULB-CC of the downlink after four subframes from the subframe in which the uplink data is received except for the downlink subframe of the unavailable subframe. Although one ULB-CC has been described in the present modification example, a plurality of ULB-CCs may be present. In this case, the transmission timing of the ACK/NACK of the present modification example in each ULB-CC may be applied. The timing of the subframe of the ULB-CC of the present modification example may be adjusted by synchronizing the timings of the ULB base station apparatus and the terminal device, or the timing between the ULB base station apparatus and the terminal device may be adjusted to the timing of the subframe of the LB-CC of the macro base station apparatus. In a case where the subframe is not the available subframe during a predetermined period from the resource allocation information of the uplink or the timing of the data transmission of the uplink, the ACK/NACK of the data of the uplink may be transmitted in different CCs (for example, LB-CCs).

As mentioned above, in the present modification example, the ULB base station apparatus share the information indicating whether the subframe is the available subframe or the unavailable subframe and the terminal device, and the terminal device transmits the ACK/NACK in the first downlink subframe after four subframes from the subframe in which the uplink data is received except for the downlink subframe of the unavailable subframe. As a result, it is possible to avoid the collision even though another system occupies the ULB-CC from when the uplink data is received to when the ACK/NACK is transmitted, and spectral efficiency is improved by suppressing a deteriorate in communication quality of the ULB-CC.

Modification Example 2 of Second Embodiment

In the present modification example, a method of transmitting the ACK/NACK of the downlink transmission in a case where the ULB base station apparatus determines whether the subframe is the available subframe or the unavailable subframe in the subframe of the carrier sense as in the second embodiment and Modification Example 1 of the second embodiment and the ULB base station apparatus transmits the PSS/SSS in a case where the subframe is the available subframe will be described.

In the present modification example, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present modification example, and the description of the same processes will be omitted.

When the ULB base station apparatus performs the data transmission of the downlink, resource allocation information (DL grant) of the downlink is generated by the control signal generation unit 1017, and is transmitted to the terminal device. The terminal device detects the resource allocation information (DL grant) by the control signal detection unit 209 through blind decoding, and performs the reception process of the data based on the resource allocation information. As a result of the reception process of the data, ACK/NACK which is information indicating whether or not the resource allocation information is normally detected is generated by the UL control information generation unit 215.

Figure 14:
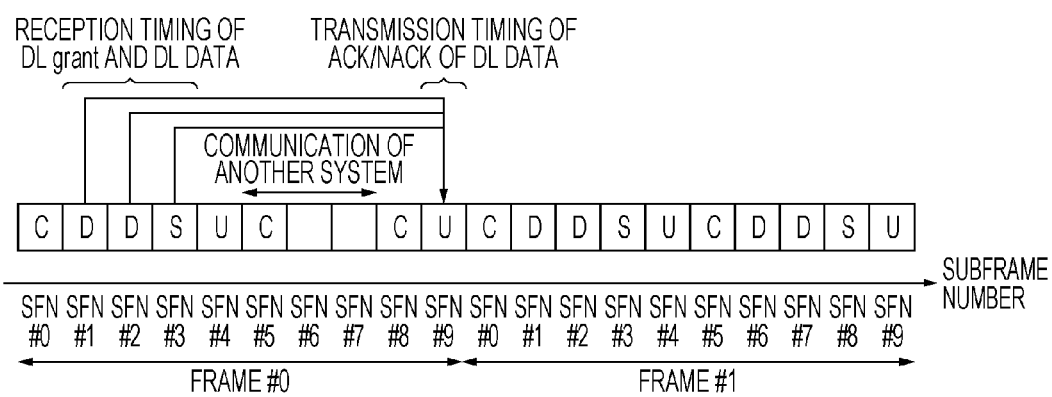
FIG. 14 is a diagram showing an example of the transmission of ACK/NACK of the downlink according to the present invention.

FIG. 14 shows an example of the transmission of the ACK/NACK to the downlink according to the present invention. This drawing is an example of the correspondence of the timing when the wireless transmission unit 213 of the terminal device transmits the control information of the uplink including the ACK/NACK with the reception timing of the resource allocation or the data of the downlink. For example, in a case where the timing when the terminal device receives the resource allocation or the data of the downlink is any one of the subframe #1, #2, and #3 of the frame #0, the terminal device transmits the ACK/NACK in the first uplink subframe after four subframes from the subframe in which the resource allocation or the data of the downlink is received. In the example of FIG. 14, the subframe #9 of the frame #0 is available. Here, the ULB base station apparatus determines whether the subframe is the available subframe which is not occupied by another system or the unavailable subframe which is occupied by another system for each subframe of the carrier sense. Initially, in a case where the subframes #5 to #9 of the frame #0 are the available subframes, since the subframe #9 of the frame #0 is able to be used, the terminal device transmits the ACK/NACK of the data received in at least one of the subframes #1, #2, and #3 of the frame #0 in the subframe #9 of the frame #0.

Hereinafter, a case where the subframes #5 to #7 of the frame #0 are the unavailable subframes as the result of the carrier sense by the ULB base station apparatus is an operation of FIG. 14. The ULB base station apparatus does not transmit the PSS/SSS. Thus, since the PSS/SSS is not able to be detected, the terminal device determines that the subframes #5 to #7 of the frame #0 are the unavailable subframes. The ULB base station apparatus performs the carrier sense in the previous subframe (the subframe #8 of the frame #0) of the uplink subframe. For example, the ULB base station apparatus performs the carrier sense in the first slot of the subframe #8 of the frame #0. In a case where it is determined that the subframes #8 and #9 of the frame #0 are the available subframes as the result of the carrier sense, the ULB base station apparatus transmits the PSS/SSS in the last OFDM symbol of the subframe #8 of the frame #0 as illustrated in FIG. 9. The terminal device detects the PSS/SSS in the subframe #8 of the frame #0, determines that the subframe #9 of the frame #0 is the available subframe, and transmits the ACK/NACK.

Although it has been described in the present modification example that the information indicating whether the subframe is the available subframe or the unavailable subframe is notified between the ULB base station apparatus and the terminal device in the detection of the same PSS/SSS as that of the previous embodiment, the present invention is not limited to this method. That is, an example in which the terminal device determines whether or not the subframe is the available subframe or the unavailable subframe by another method and the ACK/NACK is transmitted in the first uplink subframe after four subframes from the subframe in which the downlink data is received except for the uplink subframe of the unavailable subframe is included in the present invention. Although the transmission timing of the ACK/NACK of the reception of the resource allocation or the data of the downlink has been described in the present modification example, the present modification example may be applied to the transmission timing of the data of the uplink regarding the resource allocation of the uplink. Although it has been described in the present modification example that the ULB base station apparatus may perform the carrier sense in the subframe #8 of the frame #0, the terminal device performs the carrier sense in the subframe #8, and may transmit the ACK/NACK in the subframe #9 of the frame #0 in a case where it is determined that the subframe is the available subframe which is not occupied by another system. Although it has been described in the present modification example that the special subframe of the subframe #8 of the frame #0 is the subframe of the carrier sense in a case where another system occupies the ULB-CC in the subframe #5 of the frame #0, the special subframe may be constantly regarded as the subframe of the carrier sense. The present modification example may be applied to FDD. In a case where the CCs of the downlink and the uplink are present in the ULB-CC, the terminal device may perform the carrier sense before the subframe of the ULB-CC of the uplink after four subframes from the subframe in which the downlink data is received except for the uplink subframe of the unavailable subframe. Although one ULB-CC has been described in the present modification example, a plurality of ULB-CCs may be present. In this case, the transmission timing of the ACK/NACK may be determined based on the result of the carrier sense by the terminal device in each ULB-CC as in the present modification example. The timing of the subframe of the ULB-CC of the present modification example may be adjusted by synchronizing the timings of the ULB base station apparatus and the terminal device, or the timing between the ULB base station apparatus and the terminal device may be adjusted to the timing of the subframe of the LB-CC of the macro base station apparatus. In a case where the terminal device performs the carrier sense, the terminal device may perform the carrier sense on only a frequency band used for the transmission within all frequency bands capable of being used for the data transmission of the ULB-CC, and the ULB base station apparatus may perform the carrier sense on all the frequency bands capable of being used for the data transmission of the ULB-CC.

As stated above, in the present modification example, the ULB base station apparatus and the terminal device share the information indicating whether the subframe is the available subframe or the unavailable subframe, and the terminal device transmits the ACK/NACK in the first uplink subframe after four subframes from the subframe in which the downlink data is received except for the uplink subframe of the unavailable subframe. As a result, it is possible to avoid the collision even though another system occupies the ULB-CC from when the downlink data is received to when the ACK/NACK is transmitted, and spectral efficiency is improved by suppressing a deteriorate in communication quality of the ULB-CC. Even though another system occupies the ULB-CC in the subframe of the carrier sense present before the downlink subframe, the carrier sense is performed before the uplink subframe. As a result, in a case where another system does not complete the communication before the uplink subframe, since only the uplink subframe is able to be used even though the downlink subframe is not able to be used, a transmission occasion of the uplink is increased, and thus, spectral efficiency is improved.

Third Embodiment

In the third embodiment of the present invention, a method of transmitting the ACK/NACK of the downlink transmission in a case where the ULB base station apparatus determines whether the subframe is the available subframe or the unavailable subframe in the subframe of the carrier sense as in the previous embodiment and the ULB base station apparatus transmits the PSS/SSS in a case where the subframe is the available subframe will be described.

In the present embodiment, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present embodiment, and the description of the same processes will be omitted.

When the ULB base station apparatus performs the data transmission of the downlink, resource allocation information (DL grant) of the downlink is generated by the control signal generation unit 1017, and is transmitted to the terminal device. The terminal device detects the resource allocation information (DL grant) by the control signal detection unit 209 through blind decoding, and performs the reception process of the data based on the resource allocation information. As a result of the reception process of the data, ACK/NACK which is information indicating whether or not the resource allocation information is normally detected is generated by the UL control information generation unit 215.

Figure 15:
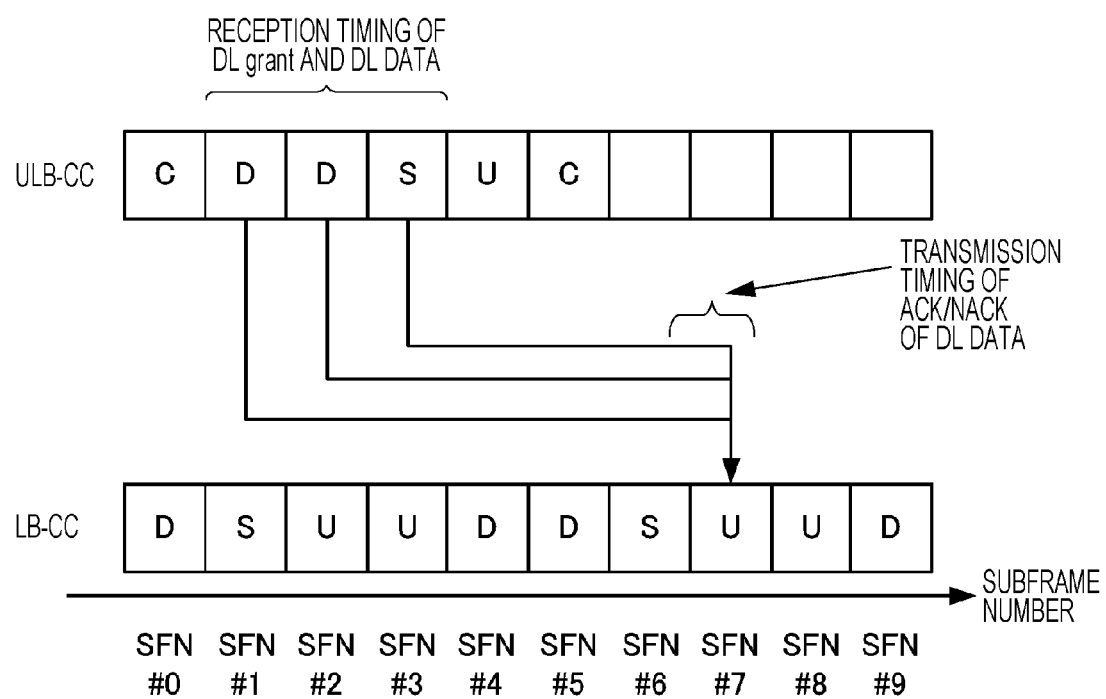
FIG. 15 is a diagram showing an example of the transmission of ACK/NACK of the downlink according to the present invention.

FIG. 15 shows an example of the transmission of the ACK/NACK to the downlink according to the present invention. This drawing is an example of the correspondence of the timing when the wireless transmission unit 213 of the terminal device transmits the control information of the uplink including the ACK/NACK with the reception timing of the resource allocation or the data of the downlink. For example, in a case where the timing when the terminal device receives the resource allocation or the data of the downlink is any one of the subframe #1, #2, and #3 of the ULB-CC, the terminal device transmits the ACK/NACK in the first uplink subframe after four subframes from the subframe in which the resource allocation or the data of the downlink is received. In the example of FIG. 15, the subframe #9 of the ULB-CC is available. Here, the ULB base station apparatus determines whether the subframe is the subframe (available subframe) which is not occupied by another system or the subframe (unavailable subframe) which is occupied by another system for each subframe of the carrier sense. Initially, in a case where the subframes #5 to #9 of the ULB-CC are the available subframes, since the subframe #9 of the ULB-CC is able to be used, the terminal device transmits the ACK/NACK of the data received in at least one of the subframes #1, #2, and #3 of the ULB-CC in the subframe #9 of the ULB-CC.

Hereinafter, a case where the subframes #5 to #7 of the ULB-CC are the unavailable subframes as the result of the carrier sense by the ULB base station apparatus is an operation of FIG. 15. This drawing shows an example in which another system uses the ULB-CC in the carrier sense of the subframe #5 of the ULB-CC, and the ULB base station apparatus does not transmit the PSS/SSS. Thus, since the PSS/SSS is not able to be detected, the terminal device determines that the subframes #5 to #9 of the ULB-CC are the unavailable subframes, and transmits the ACK/NACK in not the subframe #9 of the ULB-CC but the subframe #9 of the LB-CC. This is because it is necessary to reliably transmit the ACK/NACK in the LB-CC in a case where the ACK/NACK is not able to be transmitted in the ULB-CC since it is important to transmit the ACK/NACK without an error. In a case where the ACK/NACK is able to be transmitted in both of the LB-CC and the ULB-CC, the resource of the LB-CC may be preferentially used.

Although it has been described in the present embodiment that the information indicating whether the subframe is the available subframe or the unavailable subframe between the ULB base station apparatus and the terminal device is notified in the detection of the same PSS/SSS as that of the previous embodiment, the present invention is not limited to this method. That is, an example in which the terminal device determines whether or not the subframe is the available subframe or the unavailable subframe by another method and the ACK/NACK is transmitted in the first uplink subframe after four subframes from the subframe in which the downlink data is received except for the uplink subframe of the unavailable subframe is included in the present invention. Although the transmission timing of the ACK/NACK of the reception of the resource allocation or the data of the downlink has been described in the present embodiment, the present embodiment may be applied to the transmission timing of the data of the uplink regarding the resource allocation of the uplink. Although it has been described in the present embodiment that the ULB base station apparatus performs the carrier sense in the subframe #0 of the ULB-CC, the ULB base station apparatus or the terminal device may perform the carrier sense in the subframe #8 of the ULB-CC as in Modification Example 2 of the second embodiment. In this case, in a case where it is determined that the subframe is the available subframe which is not occupied by another system, the terminal device may transmit the ACK/NACK in the subframe #9 of the ULB-CC as the available subframe. In the present embodiment, in a case where another system occupies the ULB-CC in the subframe #5 of the ULB-C, even though the special subframe of the subframe #8 of the ULB-CC is the subframe of the carrier sense, the special subframe may be constantly regarded as the subframe of the carrier sense. Although it has been described in the present embodiment that both the resource allocation of the downlink and the data transmission of the downlink are performed in the ULB-CC, the resource allocation of the downlink may be performed in the LB-CC and the data transmission of the downlink may be performed in the ULB-CC.

Although it has been described in the present embodiment that the number of LB-CCs is one, a plurality of LB-CC may be present, and the LB-CC in which the ACK/NACK is transmitted may be determined based on a predetermined priority level of the LB-CC and the information of the LB-CC associated with the ULB-CC in a case where the ACK/NACK is not able to be transmitted in the ULB-CC. The present embodiment may be applied to FDD. In a case where the CCs of the downlink and the uplink are present in the ULB-CC, if the ULB-CC of the uplink is the unavailable subframe, the ACK/NACK may be transmitted in the LB-CC of the uplink similarly to the present embodiment.

As stated above, in the present embodiment, the ULB base station apparatus and the terminal device share the information indicating whether the subframe is the available subframe or the unavailable subframe, and the terminal device transmits the ACK/NACK in the LB-CC in a case where it is determined that the ULB-CC is the unavailable subframe at the transmission timing of the ACK/NACK. As a result, it is possible to avoid the collision even though another system occupies the ULB-CC from when the downlink data is received to when the ACK/NACK is transmitted, and spectral efficiency is improved by suppressing a deteriorate in communication quality of the ULB-CC. In the present embodiment, the terminal device may transmit the ACK/NACK without a delay at the transmission timing of the ACK/NACK by switching to the LB-CC even though the ULB-CC is the unavailable subframe unlike the timing of the ACK/NACK of the related art. Even though another system occupies the ULB-CC in the subframe of the carrier sense present before the downlink subframe, the carrier sense is performed before the uplink subframe. As a result, in a case where another system does not complete the communication before the uplink subframe, since only the uplink subframe is able to be used even though the downlink subframe is not able to be used, a transmission occasion of the uplink is increased, and thus, spectral efficiency is improved.

Fourth Embodiment

In the fourth embodiment of the present invention, a method of transmitting the data of the uplink in a case where the ULB base station apparatus determines whether the subframe is the available subframe or the unavailable subframe in the subframe of the carrier sense as in the previous embodiment and the ULB base station apparatus transmits the PSS/SSS in a case where the subframe is the available subframe will be described.

In the present embodiment, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present embodiment, and the description of the same processes will be omitted.

The present embodiment will be described with reference to FIG. 12. In the present embodiment, the synchronization signal generation unit 1016 of the ULB base station apparatus is different from that of the first embodiment. In a case where it is determined that the subframe is the available subframe which is not occupied by another system in the subframe #0 of the frame #0, the CS determination unit 106 inputs the information of the available subframe to the synchronization signal generation unit 1016. Although not illustrated, the synchronization signal generation unit 1016 is notified of a buffered data amount for transmission from a data amount management unit included in the S/P unit 1011. The synchronization signal generation unit 1016 generates the PSS/SSS of the synchronization signal in a case where the subframe is the available subframe, but changes a sequence to be generated depending on the buffered data amount. For example, when a Zadoff-Chu sequence or a Gold sequence is generated, a route sequence index or an initial value of a shift register is changed depending on the buffered data amount. A threshold of the buffered data amount for determining whether or not to change the route sequence index or the initial value of the shift register may be previously determined by the system. For example, PSS/SSS of a different sequence is generated in only a case where there is not transmission data of the downlink. Although it has been described that the route sequence index of the sequence or the initial value is changed, the sequence itself may be changed.

The terminal device is notified that the sequence to be used as the PSS/SSS is previously the control information, calculates a correlation value using the received PSS/SSS and candidate sequences to be transmitted, and determines whether or not the PSS/SSS is transmitted by any sequence. Here, when the terminal device detects the sequence of the PSS/SSS used in a case where the buffered data amount for a downlink exceeds a threshold in the ULB base station apparatus, the terminal device performs the same process as that of the previous embodiment. Meanwhile, in a case where the buffered data amount for the downlink in the ULB base station apparatus is less than the threshold, the terminal device performs the following process.

The terminal device receives the resource allocation of the uplink in any one of the subframes #1, #2, and #3 of the frame #0 of FIG. 12, and determines whether the subframes #5 to #9 of the frame #0 are the available subframes using the PSS/SSS transmitted from the ULB base station apparatus. In a case where the PSS/SSS indicating that the subframes #5 to #9 of the frame #0 are the available subframes is the sequence used when the buffered data amount for the downlink exceeds the threshold in the ULB base station apparatus, the terminal device regards the subframe #8 of the frame #0 as the subframe of the carrier sense. In a case where there is not data of the downlink, there is a possibility that another system will perform the carrier sense in the subframes #6 and #7 of the frame #0 and will determine that the ULB-CC is not used, and there is a possibility that another system will start communication. Thus, if the terminal device does not perform the carrier sense in the subframe #8 of the frame #0 which is present before the uplink subframe, there is a possibility that the communication of the terminal device will collide with the communication of another system. Thus, in the present embodiment, it is possible to notify the terminal device of whether or not to perform the carrier sense using the sequence of the PSS/SSS transmitted from the ULB base station apparatus before the uplink subframe. The wireless reception units 202-1 and 202-2 of the terminal device perform the carrier sense in the subframe #8 of the frame #0, and determine whether or not to transmit the uplink data in the subframe #9 of the frame #0 based on the result thereof. In a case where the uplink data is not able to be transmitted in the subframe #9 of the frame #0, the terminal device transmits the uplink data by any one of the methods described in the previous embodiments. The terminal device regards a sequence that is likely to be transmitted from the ULB base station apparatus as being previously notified or as being configured on a per ULB-CC basis, and similarly regards the relationship between the sequence and the buffered data amount for the downlink as being notified or as being configured on a per ULB-CC basis.

The present embodiment may be applied to a case where the ACK/NACK of the downlink is transmitted. For example, in FIG. 10, the terminal device receives the data or the resource allocation of the downlink in any one of the subframes #1 to #3 of the frame #0, and determines whether or not the subframes #5 to #9 of the frame #0 are the available subframes using the PSS/SSS transmitted from the ULB base station apparatus. In a case where the PSS/SSS indicating that the subframes #5 to #9 of the frame #0 are the available subframes is the sequence used when the buffered data amount for the downlink exceeds the threshold in the ULB base station apparatus, the terminal device regards the subframe #8 of the frame #0 as the subframe of the carrier sense. The wireless reception units 202-1 and 202-2 of the terminal device perform the carrier sense in the subframe #8 of the frame #0, and determine whether or not transmit the ACK/NACK in the subframe #9 of the frame #0 based on the result thereof. In a case where the uplink data is not able to be transmitted in the subframe #9 of the frame #0, the terminal device transmits the ACK/NACK by any one of the methods described in the previous embodiments.

Although it has been described in the present embodiment that the terminal device notifies of whether or not to perform the carrier sense by using the sequence of the PSS/SSS before the ACK/NACK of the data of the downlink or the data of the uplink is transmitted, another information may be notified using the sequence of the PSS/SSS. For example, a plurality of sequence candidates of the PSS/SSS may be prepared, and the terminal device may notify of the CC (ULB-CC or CC) in which this signal is transmitted by using the sequence of the PSS/SSS in a case where there is a plurality of ULB-CC candidates in which the ACK/NACK of the data of the downlink or the data of the uplink is transmitted. Although it has been described in the present embodiment that the terminal device performs the carrier sense in a case where the PSS/SSS is the sequence used when the buffered data amount for the downlink exceeds the threshold in the ULB base station apparatus, the ULB base station apparatus may perform the carrier sense. In such a case, in a case where it is determined that the uplink subframe is the available subframe as the result of the carrier sense, the ULB base station apparatus notifies the terminal device by transmitting the PSS/SSS. The transmission timing of the PSS/SSS may be any timing of the special subframe, may be a part (last OFDM symbol) of the OFDM symbols of the DwPTS, may be a part of the GPs, or may a part of the OFDM symbols of the UpPTS. The present embodiment may be applied to FDD. In a case where the CCs of the downlink and the uplink are present in the ULB-CC, the information indicating whether the subframe is the available subframe or the unavailable subframe and information indicating whether or not the terminal device needs to perform the carrier sense in the subframe before the transmission of the ACK/NACK in the ULB-CC of the uplink may be notified by using the sequence of the PSS/SSS transmitted from the ULB base station apparatus. Although one ULB-CC has been described in the present embodiment, a plurality of ULB-CCs may be present. In this case, the transmission timing of the ACK/NACK of the present embodiment in each ULB-CC may be applied. The timing of the subframe of the ULB-CC of the present embodiment may be adjusted by synchronizing the timings of the ULB base station apparatus and the terminal device, or the timing between the ULB base station apparatus and the terminal device may be adjusted to the timing of the subframe of the LB-CC of the macro base station apparatus.

As stated above, in the present embodiment, the information indicating whether or not the subframe is the available subframe or the unavailable subframe and the information indicating whether or not the terminal device needs to perform the carrier sense before the uplink subframe may be notified using the sequence of the PSS/SSS transmitted from the ULB base station apparatus. As a result, it is possible to avoid the collision even though another system occupies the ULB-CC during a period from the timing when the ULB base station apparatus performs the carrier sense to the data transmission of the uplink, and spectral efficiency is improved by suppressing a deteriorate in communication quality in the ULB-CC.

Modification Example 1 of Fourth Embodiment

In the present modification example, a method of transmitting the data of the uplink in a case where the ULB base station apparatus determines whether the subframe is the available subframe or the unavailable subframe in the subframe of the carrier sense as in the previous embodiment and the ULB base station apparatus transmits the PSS/SSS in a case where the subframe is the available subframe will be described.

In the present modification example, structure examples of the ULB base station apparatus and the terminal device are the same as those of the first embodiment, and are respectively illustrated in FIGS. 4 and 6. A structure example of the DL signal generation unit 101 of the ULB base station apparatus is also the same as that of the first embodiment, and is illustrated in FIG. 5. Thus, only different processes will be described in the present modification example, and the description of the same processes will be omitted.

The present modification example will be described with reference to FIG. 12. In the present modification example, the S/P unit 1011 of the ULB base station apparatus is different from that of the first embodiment. In a case where it is determined that the subframe is the available subframe which is not occupied by another system in the subframe #0 of the frame #0, the CS determination unit 106 inputs the information of the available subframe to the S/P unit 1011. A data amount management unit included in the S/P unit 1011 manages information of the buffered data amount for the transmission, and inputs dummy data to the data signal generation units 1012-1 and 1012-2 in a case where the data amount is less than the threshold. Here, the threshold of the buffered data amount which is used for determining whether or not to input the dummy data may be previously determined by the system.

In a case where there is not data of the downlink, there is a possibility that another system will perform the carrier sense in the subframes #6 and #7 of the frame #0 and will determine that the ULB-CC is not used, and there is a possibility that another system will start communication. Thus, the ULB base station apparatus transmits the dummy data so as to recognize that the communication is performed between the ULB base station apparatus and the terminal device even though another system performs the carrier sense. A density of the reference signal may be increased instead of using the dummy data.

Although the data transmission of the uplink of FIG. 12 has been described in the present modification example, the present invention may be applied up to the transmission timing of the ACK/NACK of the downlink data of FIG. 10. The ULB base station apparatus may transmit the RTS or CTS-to-self instead of transmitting the dummy data, and may configure the NAV.

Although one ULB-CC has been described in the present embodiment, a plurality of ULB-CCs may be present. In this case, the transmission timing of the ACK/NACK of the present embodiment in each ULB-CC may be applied. The timing of the subframe of the ULB-CC of the present embodiment may be adjusted by synchronizing the timings of the ULB base station apparatus and the terminal device, or the timing between the ULB base station apparatus and the terminal device may be adjusted to the timing of the subframe of the LB-CC of the macro base station apparatus.

As mentioned above, in the present modification example, the ULB base station apparatus can reserve the resources from the resource allocation of the uplink to the transmission of the uplink. As a result, since another system is not able to occupy the ULB-CC during a period from the timing when the ULB base station apparatus performs the carrier sense to the data transmission of the uplink, it is possible to avoid the collision, and spectral efficiency is improved by suppressing a deteriorate in communication quality in the ULB-CC.

The programs operated in the base station apparatus and the terminal devices according to the present invention may be programs (programs causing a computer to function) for controlling a CPU such that the functions of the above-described embodiments according to the present invention are realized. The information items treated by these apparatuses and devices are temporally accumulated in a RAM during the processing, are stored in various ROMs or HDDs, are read by the CPU if necessary, and are modified and rewritten. Here, as a recording medium that stores the programs, any one of a semiconductor medium (for example, ROM or non-volatile memory card), an optical recording medium (for example, DVD, MO, MD, CD, and BD), a magnetic recording medium (for example, magnetic tape and flexible disk) may be used. The functions of the present invention may be realized by performing the process in cooperation with other application programs or an operating system based on the instruction of the program, in addition to realizing the functions of the aforementioned embodiments by executing the loaded program.

When the programs are distributed on the market, the programs may be distributed by being stored in a portable recording medium, or may be transmitted to a server computer connected via a network such as the Internet. In this case, a storage device of the server computer may also be included in the present invention. Some or all of the base station apparatuses and the terminal devices of the above-described embodiments may be typically realized as large scale integration (LSI) which is integrated circuit. The functional blocks of the base station apparatuses and the terminal devices may be separately realized as chips, or some or all thereof may be integrated and realized as chips. A method for achieving the integrated circuit is not limited to the LSI, but may be realized by a dedicated circuit or a general-purpose processor. In a case where the respective functional blocks are realized as the integrated circuits, an integrated circuit control unit for controlling these circuits is provided.

A method for achieving the integrated circuit is not limited to the LSI, but may be realized by a dedicated circuit or a general-purpose processor. In a case where a technology of realizing the devices or functional blocks as the integrated circuit has appeared instead of the LSI due to the advance of semiconductor technology, it is possible to use an integrated circuit produced using this technology.

The present invention is not limited to the above-described embodiments. The terminal device according to the present invention is not limited to the application to a mobile station apparatus, and may be applied to stationary or non-movable electronic devices which are installed indoors or outdoors, such as AV devices, kitchen devices, cleaning and washing machines, air conditioners, office devices, vending machines, and other home appliances.

The embodiments of the present invention have been described with reference to the drawings. However, the detailed structure is not limited to the above-described embodiments, and the present invention also includes a change in the design within the gist of the invention. The present invention may be variously changed without departing from the claims, and embodiments acquired by appropriately combining technical means disclosed in different embodiments are included in the technical range of the present invention. The elements described in the respective embodiments and structures acquired by replacing the elements that exhibit the same effects are included therein.

The present international application claims priority based on Japanese Patent Application No. 2014-137377 filed on Jul. 3, 2014, and the entire content of Japanese Patent Application No. 2014-137377 is incorporated by reference in the present international application.

REFERENCE SIGNS LIST

10 MACRO BASE STATION APPARATUS
11 ULB BASE STATION APPARATUS
21, 22 TERMINAL DEVICE
101 DL SIGNAL GENERATION UNIT
102-1, 102-2 WIRELESS TRANSMISSION UNIT
103-1, 103-2 TRANSMIT ANTENNA
104 RECEIVE ANTENNA
105 WIRELESS RECEPTION UNIT
106 CS DETERMINATION UNIT
107 UL SIGNAL DEMODULATION UNIT
1011 S/P UNIT
1012-1, 1012-2 DATA SIGNAL GENERATION UNIT
1013-1, 1013-2 SYNCHRONIZATION SIGNAL MULTIPLEXING UNIT
1014-1, 1014-2 CONTROL SIGNAL MULTIPLEXING UNIT
1015-1, 1015-2 REFERENCE SIGNAL MULTIPLEXING UNIT
1016-1, 1016-2 SYNCHRONIZATION SIGNAL GENERATION UNIT
1017-1, 1017-2 CONTROL SIGNAL GENERATION UNIT
1018-1, 1018-2 REFERENCE SIGNAL GENERATION UNIT
1019-1, 1019-2 IFFT UNIT
201-1, 201-2 RECEIVE ANTENNA
202-1, 202-2 WIRELESS RECEPTION UNIT
203-1, 203-2 FFT UNIT
205-1, 205-2 CONTROL SIGNAL DEMULTIPLEXING UNIT
206-1, 206-2 REFERENCE SIGNAL DEMULTIPLEXING UNIT
207 RECEPTION SIGNAL DETECTION UNIT
208 CHANNEL ESTIMATION UNIT
209 CONTROL SIGNAL DETECTION UNIT
210 AVAILABLE SUBFRAME DETERMINATION UNIT
211 UL SIGNAL GENERATION UNIT
212 UL CONTROL INFORMATION MULTIPLEXING UNIT
213 WIRELESS TRANSMISSION UNIT
214 TRANSMIT ANTENNA
215 UL CONTROL INFORMATION GENERATION UNIT

The invention claimed is:

1. A base station apparatus that communicates with a terminal device in a second frequency band different from a first frequency band capable of being used as a dedicated frequency band, the base station apparatus comprising:
a CS determination unit that performs carrier sense in a subframe of carrier sense configured in the second frequency band;
a synchronization signal generation unit that generates a synchronization signal; and
a wireless transmission unit that transmits a transmit signal including the synchronization signal, wherein
in a case where the CS determination unit determines that another system does not perform communication in the second frequency band, the wireless transmission unit transmits the transmit signal during a prescribed time,
the wireless transmission unit transmits the transmit signal at all subframes in a radio frame on the first frequency band and transmits the transmit signal at a portion of a subframe in a radio frame on the second frequency band after the carrier sense, and
a timing when the wireless transmission unit transmits the synchronization signal on the second frequency band is a same OFDM symbol number as the first frequency band after the carrier sense.

2. The base station apparatus according to claim 1, further comprising:
a transmit-power control unit,
wherein, in a case where the synchronization signal is transmitted in a last OFDM symbol of a subframe of the carrier sense, the transmit-power control unit reduces a transmit power lower than that in a case where the synchronization signal is transmitted in a subframe of a downlink.

3. The base station apparatus according to claim 1, further comprising:
a wireless reception unit,
wherein the wireless reception unit starts a process of receiving a signal transmitted from the terminal device at a timing shorter than a previously configured guard period by at least one OFDM symbol time.

4. The base station apparatus according to claim 3, wherein the wireless transmission unit transmits the synchronization signal in a part of the guard period.

5. The base station apparatus according to claim 1, further comprising:
a data amount management unit,
wherein, in a case where a data amount of a downlink buffered from the data amount management unit is less than a previously configured threshold, the synchronization signal generation unit generates a synchronization signal of a sequence different from that in a case where the buffered data amount of the downlink exceeds the threshold.

* * * * *